(12) United States Patent
Kouda et al.

(10) Patent No.: US 11,646,629 B2
(45) Date of Patent: May 9, 2023

(54) ELECTRIC WORK MACHINE

(71) Applicant: MAKITA CORPORATION, Anjo (JP)

(72) Inventors: Kei Kouda, Anjo (JP); Hideki Abe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/903,081

(22) Filed: Sep. 6, 2022

(65) Prior Publication Data

US 2022/0416619 A1 Dec. 29, 2022

Related U.S. Application Data

(63) Continuation of application No. 16/567,303, filed on Sep. 11, 2019, now Pat. No. 11,462,967.

(30) Foreign Application Priority Data

Oct. 5, 2018 (JP) .............................. JP2018-190305

(51) Int. Cl.
*H02K 5/08* (2006.01)
*H02K 7/00* (2006.01)
(Continued)

(52) U.S. Cl.
CPC ............. *H02K 7/003* (2013.01); *A01D 34/78* (2013.01); *H02K 5/08* (2013.01); *H02K 5/161* (2013.01);
(Continued)

(58) Field of Classification Search
CPC .... A01D 34/78; A01D 2101/00; H02K 7/003; H02K 5/08; H02K 5/161; H02K 7/083; H02K 21/16; F16C 3/02
(Continued)

(56) References Cited

U.S. PATENT DOCUMENTS

2009/0121566 A1  5/2009 Ishizeki et al.
2015/0069864 A1  3/2015 Nagahama et al.
(Continued)

FOREIGN PATENT DOCUMENTS

JP  2008263698 A  10/2008
JP  2008289235 A  11/2008
(Continued)

OTHER PUBLICATIONS

Office Action from the Japanese Patent Office dispatched Apr. 26, 2022, in related Japanese application No. 2018-190305, and machine translation thereof.

*Primary Examiner* — Terrance L Kenerly
(74) *Attorney, Agent, or Firm* — J-Tek Law PLLC; Jeffrey D. Tekanic; Scott T. Wakeman

(57) ABSTRACT

An electric work machine, such as a lawn mower includes a motor case (22) fixed inside a main-body housing (10). A brushless motor (21) is housed inside the motor case (22) and includes a stator (23) having a stator core (40), coils (45), and upper and lower insulators (42, 43), and a rotor (24) disposed inward of the stator (23) and having a rotary shaft (25). A spindle (17) is driven by the rotary shaft (25). The motor case (22) holds the stator (23) and axially supports the rotary shaft (25) via bearings (68, 76). One or more insulating members, such as an insulating cap (67) and/or a resin layer (78), provide electrical insulation between the stator core (40) and the rotary shaft (25).

19 Claims, 20 Drawing Sheets

(51) Int. Cl.
   *H02K 5/16*     (2006.01)
   *H02K 21/16*    (2006.01)
   *A01D 34/78*    (2006.01)
   *H02K 7/08*     (2006.01)
   *F16C 3/02*     (2006.01)
   *A01D 101/00*   (2006.01)

(52) U.S. Cl.
   CPC ............ *H02K 7/083* (2013.01); *H02K 21/16* (2013.01); *A01D 2101/00* (2013.01); *F16C 3/02* (2013.01)

(58) Field of Classification Search
   USPC ...................................................... 310/75 D
   See application file for complete search history.

(56) References Cited

U.S. PATENT DOCUMENTS

| | | |
|---|---|---|
| 2015/0180307 A1 | 6/2015  | Inuzuka |
| 2015/0256035 A1 | 9/2015  | Kudose et al. |
| 2016/0126798 A1 | 5/2016  | Kawanori et al. |
| 2016/0226339 A1 | 8/2016  | Niwa et al. |
| 2016/0336838 A1 | 11/2016 | Kouda et al. |
| 2016/0380510 A1 | 12/2016 | Niwa |
| 2017/0246735 A1 | 8/2017  | Hashimoto et al. |
| 2018/0205288 A1 | 7/2018  | Nagahama et al. |

FOREIGN PATENT DOCUMENTS

| | | |
|---|---|---|
| JP | 2012065401 A  | 3/2012 |
| JP | 2013255387 A  | 12/2013 |
| JP | 2015159647 A  | 9/2015 |
| JP | 2017007068 A  | 1/2017 |
| WO | 2016031719 A1 | 3/2016 |
| WO | 2018179833 A1 | 10/2018 |

ELECTRIC WORK MACHINE

CROSS-REFERENCE

The present application is a continuation of U.S. patent application Ser. No. 16/567,303 filed on Sep. 11, 2019, now U.S. Pat. No. 11,462,967, which claims priority to Japanese patent application serial number 2018-190305 filed on Oct. 5, 2018, the contents of which are incorporated fully herein by reference.

TECHNICAL FIELD

The present invention generally relates to electric work machines, such as power tools, gardening tools (e.g., lawn mowers and other types of outdoor power equipment), air compressors for pneumatic tools, and the like. In some embodiments, the present invention concerns improved electrical insulation features provided between a rotary shaft and stator core of a brushless motor and/or between the rotary shaft and a rotor core that holds and rotatable drives the rotary shaft.

BACKGROUND ART

In some electric work machines (e.g., power tools), a brushless motor, which is compact and highly durable, is used as a power source. For example, Japanese Laid-open Patent Publication 2017-7068 discloses an inner-rotor-type brushless motor that comprises a tubular-shaped stator and a rotor, which is disposed in the interior of the stator. In addition, in the brushless motor, coils are wound on a stator core through insulators that are made of resin, thereby providing electrical insulation between the stator core, which has a metal interior, and the coils, which are energized during operation.

SUMMARY OF THE INVENTION

However, if the brushless motor is to be housed in an interior case made of metal, a problem may result if there is insufficient electrical insulation between the stator core and a rotary shaft driven by the rotor.

Accordingly, one non-limiting object of the present teachings is to provide an electric work machine that can provide effective insulation between a stator core and a rotary shaft.

Additional objects of the present teachings will become apparent upon reading the following description of embodiments of the present teachings.

In a first aspect of the present teachings, an electric work machine preferably comprises an interior case fixed inside an exterior housing. A brushless motor is housed inside the interior case and comprises: a stator having a stator core, one or more coils, and an insulator interposed between the stator core and the coil(s); and a rotor disposed inward of the stator and having a rotary shaft, which drives an output part. The interior case holds the stator and axially supports the rotary shaft via a bearing. An insulating means provides electrical insulation between the stator core and the rotary shaft.

In a second aspect of the present teachings, another insulating member is provided on the rotary-shaft side and is interposed between a rotor core, which is provided in the rotor, and the rotary shaft.

In a third aspect of the present teachings, the insulating means includes a bearing-side insulating member that is provided in or on a portion of the interior case that axially supports the rotary shaft via the bearing.

In a fourth aspect of the present teachings, the bearing-side insulating member is integrally formed on the interior case.

In a fifth aspect of the present teachings, the insulating means includes a stator-side insulating member that is provided (disposed) between the interior case and the stator core.

In a sixth aspect of the present teachings, the stator-side insulating member is integrally formed on (joined to) the interior case.

In a seventh aspect of the present teachings, an electric work machine preferably comprises a brushless motor comprising a stator having a stator core, one or more coils, and an insulator interposed between the stator core and the coil(s), and a rotor disposed inward of the stator and having a rotary shaft, which drives an output part. A stator-support member supports the stator and a housing supports the stator-support member. An insulating means provides electrical insulation between the stator core and the rotary shaft.

In an eighth aspect of the present teachings, another insulating member is interposed between the housing and the stator core.

Effects of the Invention

One non-limiting effect of the present teachings is that, by using an insulating means according to the present teachings, effective insulation can be provided, e.g., between the stator core and the rotary shaft.

DETAILED DESCRIPTION OF EMBODIMENTS

Embodiments of the present teachings are explained below, with reference to the drawings.

Explanation of a Representative Lawn Mower

Figure 1:
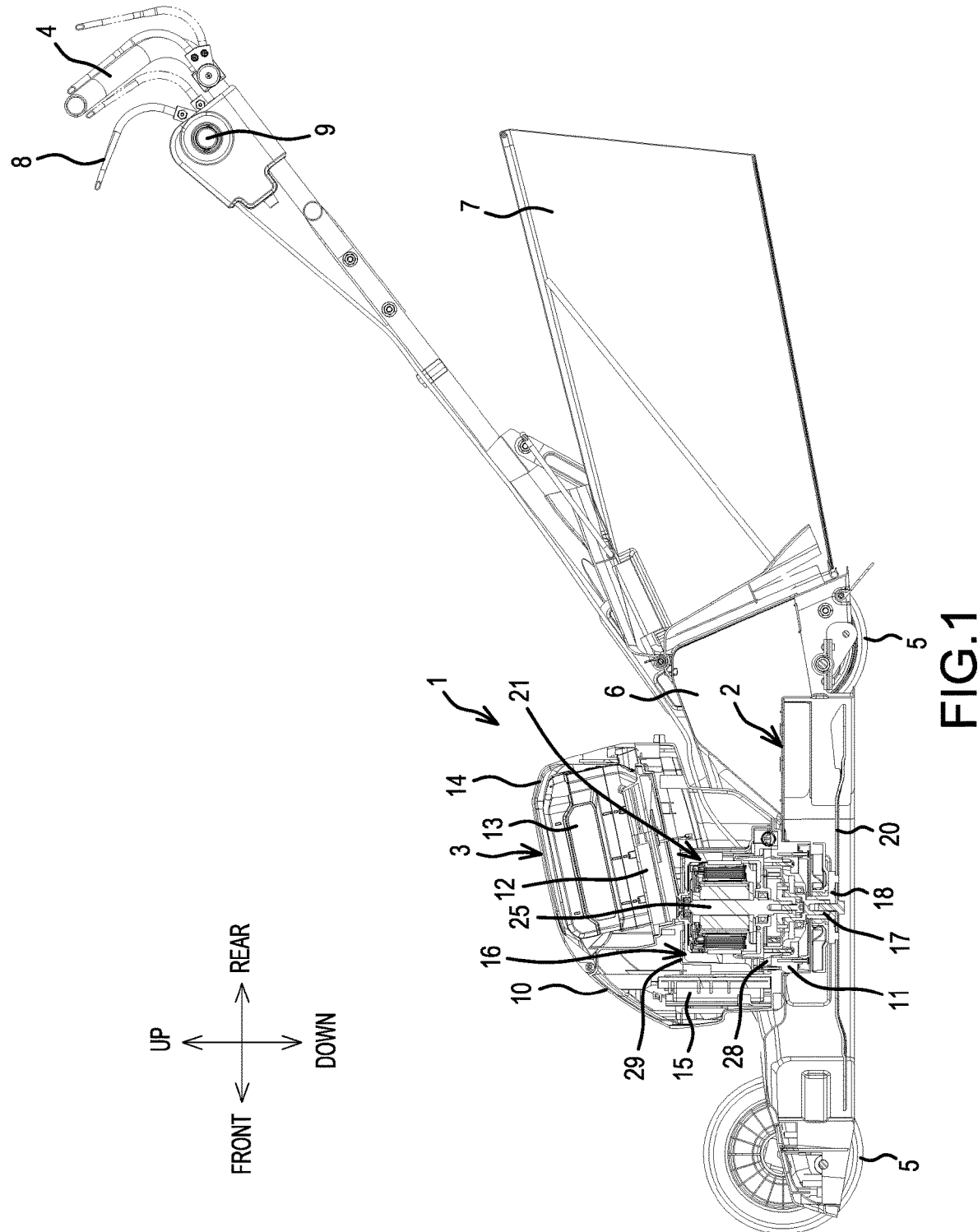
FIG. 1 is a center, longitudinal, cross-sectional view of a lawn mower according to one embodiment of the present teachings.
Figure 2:
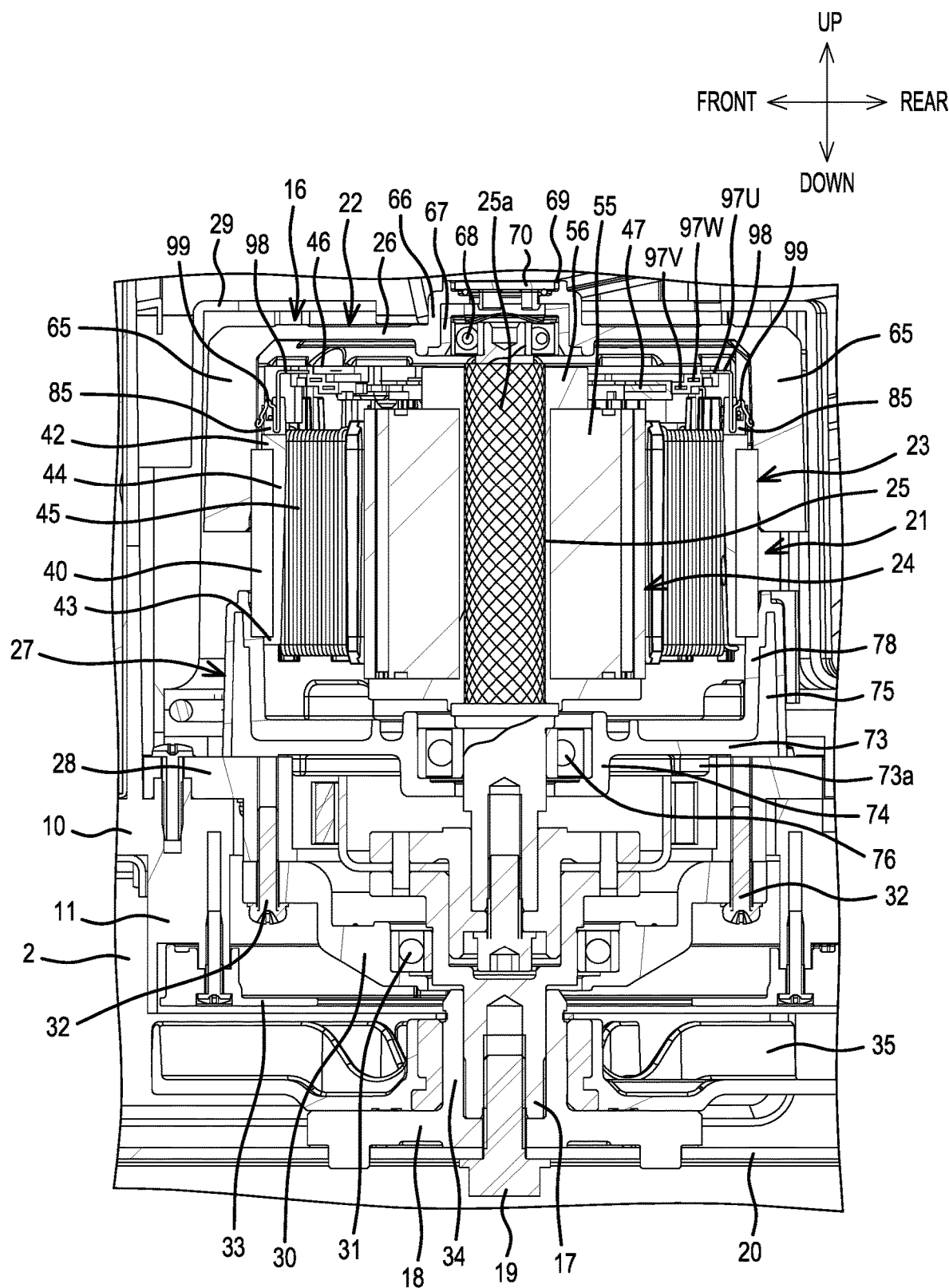
FIG. 2 is an enlarged view of a motor unit of the lawn motor.

FIG. 1 is a center, longitudinal, cross-sectional view that shows a rechargeable lawn mower 1, which is one example of an electric work machine according to the present teachings, and FIG. 2 is an enlarged view of a motor unit portion thereof.

The lawn mower 1 comprises: a base (deck) 2, which extends in a rear-front direction and has an open lower surface; a main body 3, which is coupled to a center upper side of the base 2; and a handle 4, which extends from the base 2 rearward and diagonally upward.

The base 2 has two pairs of wheels 5, 5, one pair forward and one pair rearward, and can be moved forward and rearward by using the handle 4. Downward of the handle 4, a rear cover 6 and a grass-collection basket (grass catcher) 7 are provided on a rear portion of the base 2. A switch lever 8 is provided on a rear end of the handle 4; and forward thereof, a lock-OFF button 9 is provided that, in a normal state, locks the operation of the switch lever 8. Pressing the lock-OFF button 9 unlocks the switch lever 8, so that it becomes possible to pull the switch lever 8.

The main body 3 comprises a main-body housing (cowling) 10, which has a lower end tubular part 11 that opens downward and protrudes into the base 2. A battery-mount part 12, into which one or more battery packs 13 that serve as a power supply for the lawn mower 1 can be inserted from a rear upper side, is formed on an upper part of the main-body housing 10 in an inclined manner such that it is lower in the front. The battery-mount part 12 is openable and closable by a battery cover 14.

In addition, on a front part of the main-body housing 10, a controller 15 comprising a control circuit board (not shown) is supported such that it extends vertically in an up-down direction. Rearward thereof, a motor unit 16 is provided downward of the battery-mount part 12. A rotary shaft 25 of a brushless motor 21, which is described below, protrudes downward from the motor unit 16, and a spindle 17 is coaxially coupled to a lower end of the rotary shaft 25. The spindle 17 protrudes downward from the tubular part 11 into the base 2, and a horizontal, plate-shaped cutting blade 20 is orthogonally attached to a lower end of the spindle 17 by using an inner flange 18 and a bolt 19. The spindle 17 is one non-limiting example of an output part according to the present teachings.

Figure 3:
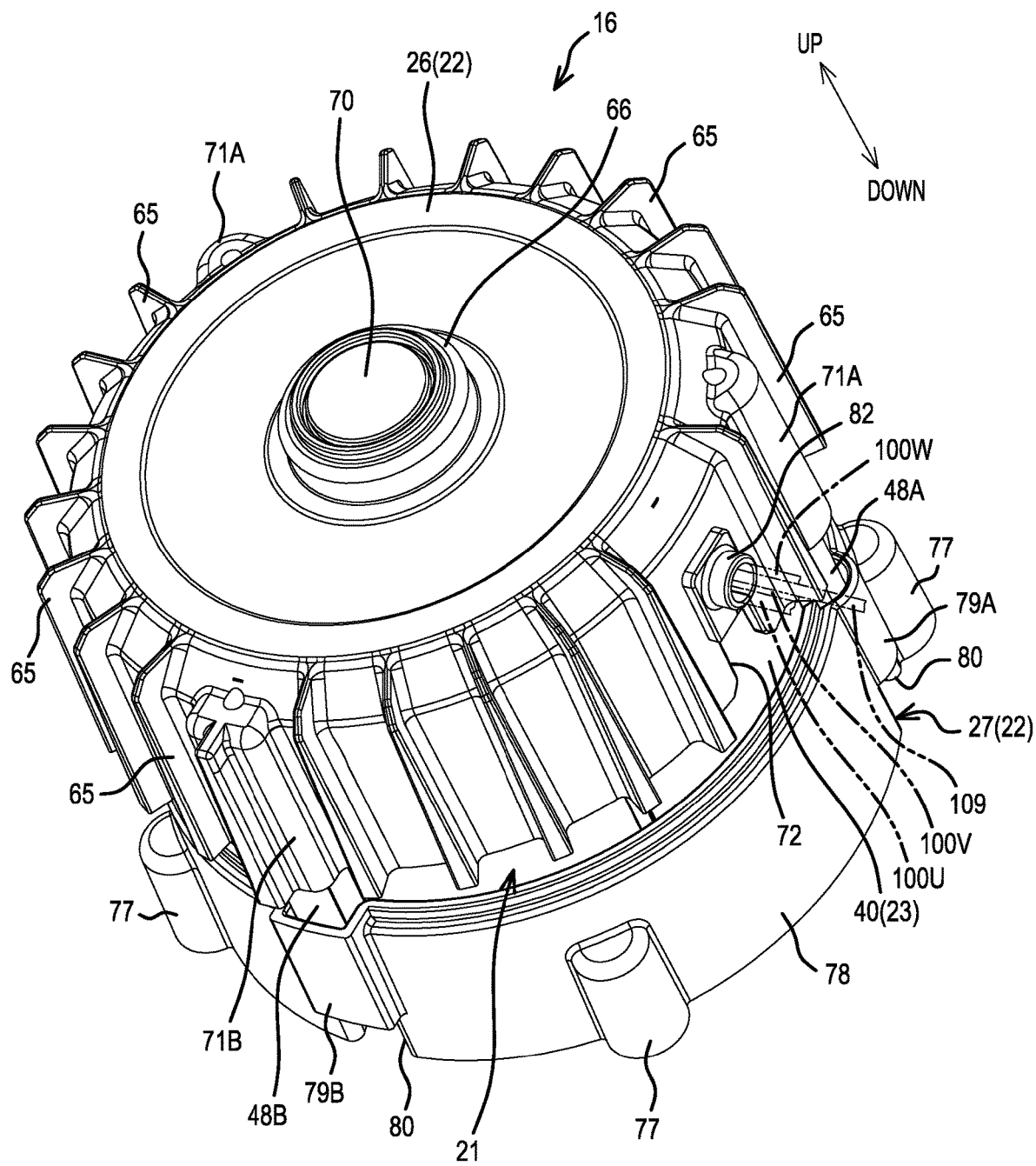
FIG. 3 is an oblique view of the motor unit.
Figure 4:
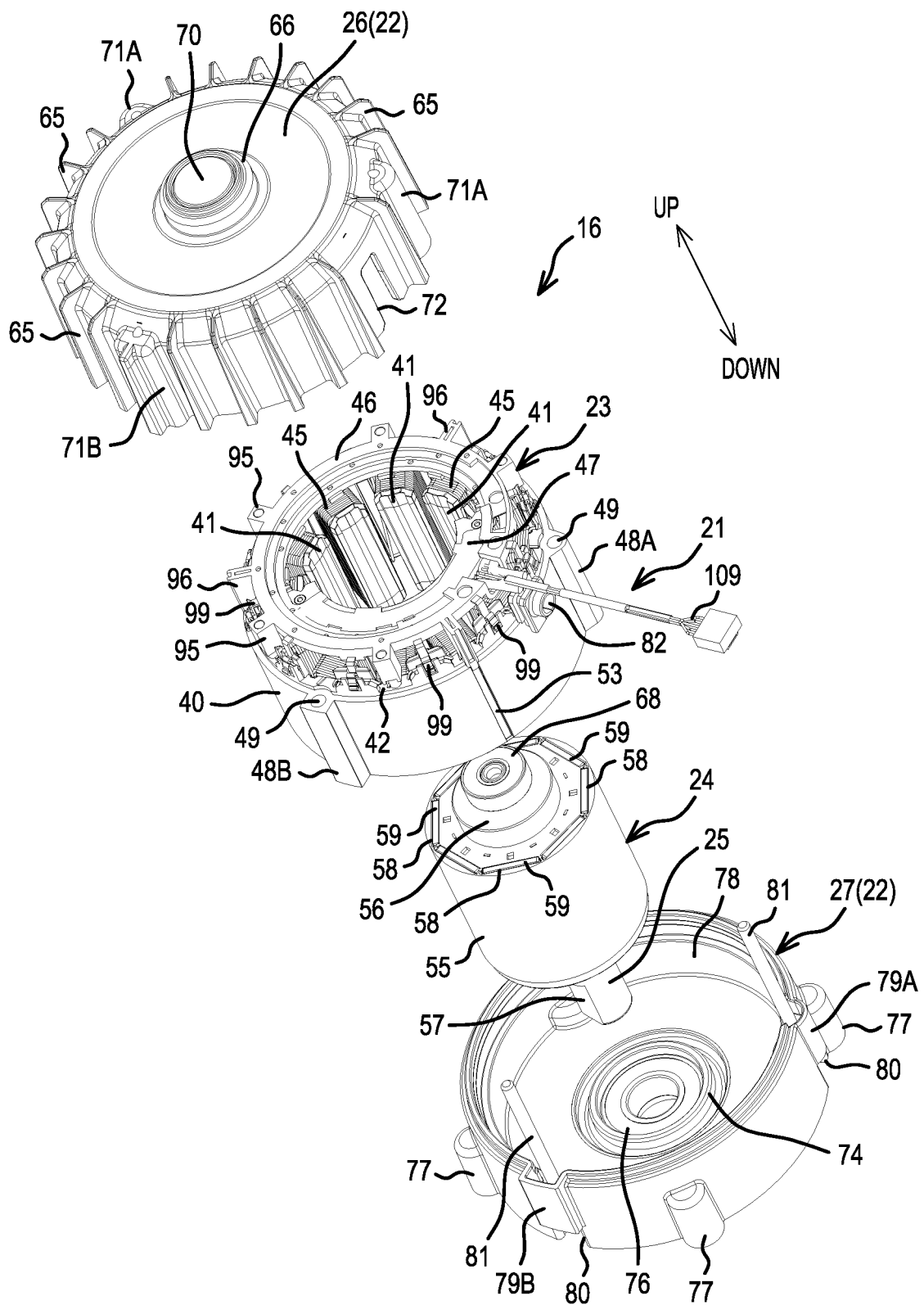
FIG. 4 is an exploded oblique view of the motor unit.

As shown in FIGS. 2-4, the motor unit 16 comprises the brushless motor 21 and a motor case 22, which holds the brushless motor 21. The brushless motor 21 is an inner-rotor type that comprises a tubular-shaped stator 23 and a rotor 24, which passes through the interior of the stator 23 and has the rotary shaft 25 at its axial center. The motor case 22 comprises an upper case 26 and a lower case 27, which hold the stator 23 from above and below and axially support the rotary shaft 25. The lower case 27 of the motor case 22 is joined to a mounting base 28, which is provided on an upper side of the tubular part 11. A motor cover 29, which covers the motor unit 16 from above, is provided upward of the mounting base 28. The upper case 26 and lower case 27 are typically made of metal.

On the other side of the motor unit 16, a bearing retainer 30, which axially supports the spindle 17 via a bearing 31, is joined, from below by a plurality of screws 32, to a lower side of the mounting base 28. A lower end of the spindle 17 passes through the bearing retainer 30 and also passes through a baffle plate 33, which is screwed onto a lower end of the tubular part 11, so as to protrude into the interior (grass cutting) space defined by the base 2. A tube part 34 mates with the lower end of the spindle 17, and is provided on the inner flange 18, on which the cutting blade 20 is mounted. A centrifugal fan 35 is provided on the outer circumference of the tube part 34.

Explanation of a Representative Stator

As shown in FIGS. 4-7, the stator 23 of the brushless motor 21 comprises a stator core 40 composed of a plurality of steel plates 40a laminated (stacked) in an axial direction (FIG. 8), and a plurality of (here, twelve) teeth 41 protrude inwardly. An upper insulator 42 and a lower insulator 43, which are made of resin or polymer, serve as electrically insulating members, and are integrally formed on both the upper and lower ends of the stator core 40. An insulation part 44, which is also made of resin or polymer, is continuous with and integrally formed with the upper and lower insulators 42, 43, i.e. insulating parts 42-44 are made from the same integral piece of resin or polymer. The insulation part 44 covers an inner-circumferential surface of the stator core 40 and an outer-circumferential surface of the teeth 41, except for the protruding end surfaces of the teeth 41. Coils 45 are respectively wound around each tooth 41 through (adjacent) the insulation part 44. A short-circuiting member 46, which is electrically connected to the wires that form the coils 45 and that forms (defines) a three-phase connection, and a sensor circuit board 47, which detects the rotational position of the rotor 24, are joined (attached) to the upper insulator 42. Further details concerning the upper and lower insulators 42, 43, the short-circuiting member 46, and the sensor circuit board 47 are provided below.

Three ridges 48A, 48A, 48B are formed on a circumferential surface of the stator core 40 such that they are equispaced in the circumferential direction. Among these, the ridges 48A, 48A each have a tapered transverse-cross-sectional shape in which the width in the circumferential direction becomes small toward the outer side of the stator core 40 in the radial direction. On the other hand, the ridge 48B is not tapered, but rather has a quadrilateral, transverse-cross-sectional shape in which its width in the circumferential direction does not vary along the radial direction. Slight rounds (curved surfaces), which expand outward along the circumferential direction, are provided on radially outward end surfaces of the ridge 48B. In addition, a through hole 49 is formed in each of the ridges 48A, 48B.

Figure 8:
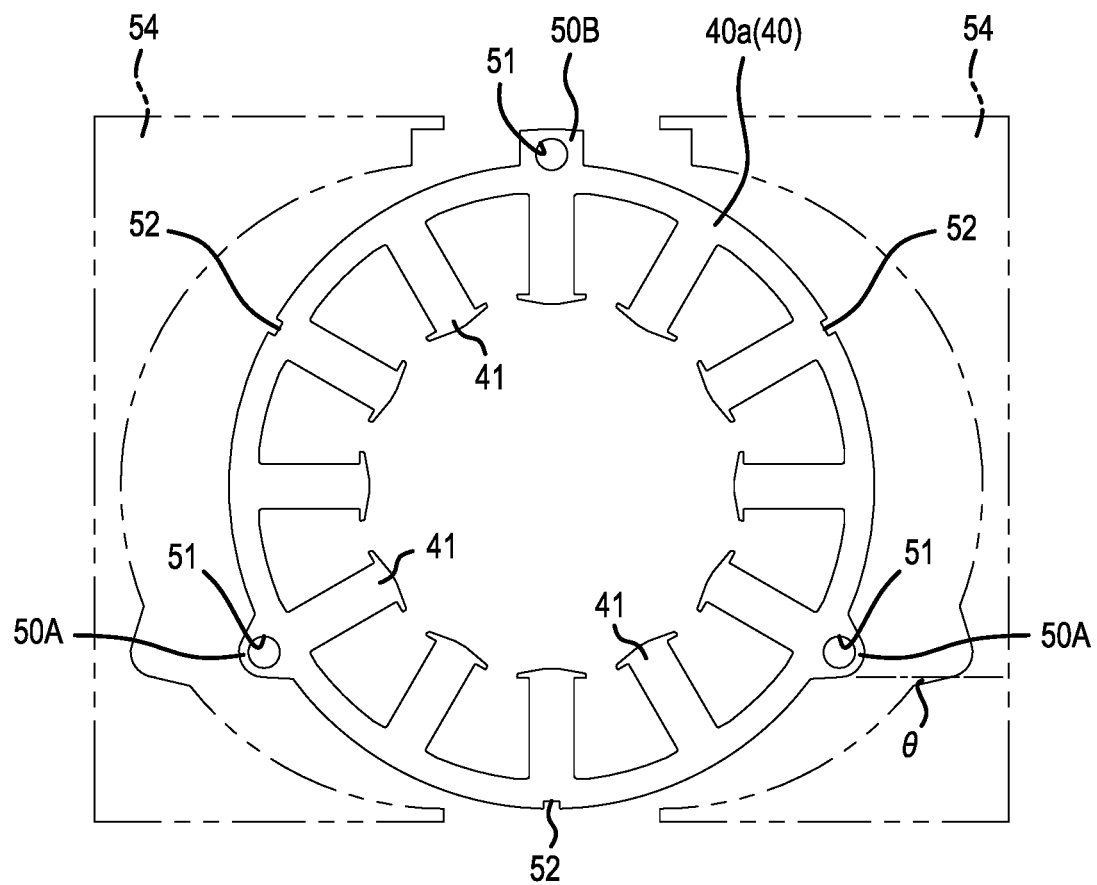
FIG. 8 is an explanatory diagram of a steel plate of a stator core and split molds.

The ridges 48A, 48B are formed such that they overlap projections 50A, 50B formed on each of the steel plates 40a as shown in FIG. 8. Among these, the projections 50A are each formed with a taper in which the width in the circumferential direction becomes small toward the outer side of the stator core 40 in the radial direction. On the other hand, the projection 50B is not tapered but rather has a quadrilateral shape in which the width in the circumferential direction does not vary along the radial direction. Pass-through holes 51 are formed in each of the projections 50A, 50B. Slight rounds (curved surfaces), which expand outward along the circumferential direction, are provided on radially outward end edges of the projection 50B. In addition, a notch 52 is formed between each adjacent pair of the projections 50A, 50B, and a grooves 53 (FIG. 7) for positioning during manufacture of the stator is formed between each adjacent pair of the ridges 48A, 48B.

The ridges 48A are tapered in this way to avoid interference with a mold at the time that the upper and lower insulators 42, 43 and the insulation part 44 are integrally formed by insert molding. That is, as shown by a chain double-dashed line in FIG. 8, when the upper and lower insulators 42, 43 and the insulation part 44 are to be integrally formed on (joined to) the stator core 40 by using left and right split molds 54, 54, the two tapered ridges 48A, 48A are positioned, one on the left and one on the right, with respect to the split molds 54, 54, and the ridges 48A, 48A are set such that they do not interfere, owing to their tapered surfaces, with the split molds 54, 54, which move in the left and right directions in FIG. 8. In the present embodiment, although the angle θ of the taper with respect to the movement direction is set to 3°, but the angle θ of the taper with respect to the movement direction may be set, e.g., within a range of 1°-10°. In addition, because rounds that expand (widen) outward also are provided on the end surfaces of the ridge 48B, interference with the left and right split molds 54, 54 is prevented.

Referring now to FIGS. 2 and 5-7, the rotary shaft 25 of the rotor 24 passes through the axial center of a circular-cylindrical-shaped rotor core 55, which is composed of a lamination of a plurality of steel plates in the axial direction. The rotor core 55 and the rotary shaft 25 are integrally joined (connected, held) together by a resin 56. A bevel part 57 (FIG. 4) is formed on the lower end of the rotary shaft 25.

The resin 56 may also be referred to as a resin insert, a resin sleeve, a resin bushing, a polymer insert, a polymer sleeve, a polymer bushing, etc., or any variations or combinations thereof. The resin 56 is thus not limited to naturally occurring resins and may comprise natural and/or synthetic polymers. Furthermore, the basic requirement of the resin 56 is that it is interposed between the rotor core 55 and rotary shaft 25, which are both typically made of a metal, and serves to connect or hold them together, so that the rotor shaft 25 rotates integrally with the rotor core 55, i.e. they are rotationally-fixed. The resin 56 also is preferably design to prevent slippage of the rotary shaft 25 relative to the rotor core 55 in or along the axial direction of the rotary shaft 25.

The resin or polymer that constitutes the resin 56 optionally may be reinforced with fibers, e.g., glass fibers, carbon fibers, etc., and preferably exhibits electrical insulation properties. For example, the resin 56 preferably has a resistivity of $1\times10^{10}$ Ω·m or higher, more preferably $1\times10^{12}$ Ω·m or higher, and/or a conductivity of $1\times10^{-10}$ σ or less, more preferably $1\times10^{-12}$ σ or less.

Figure 5:
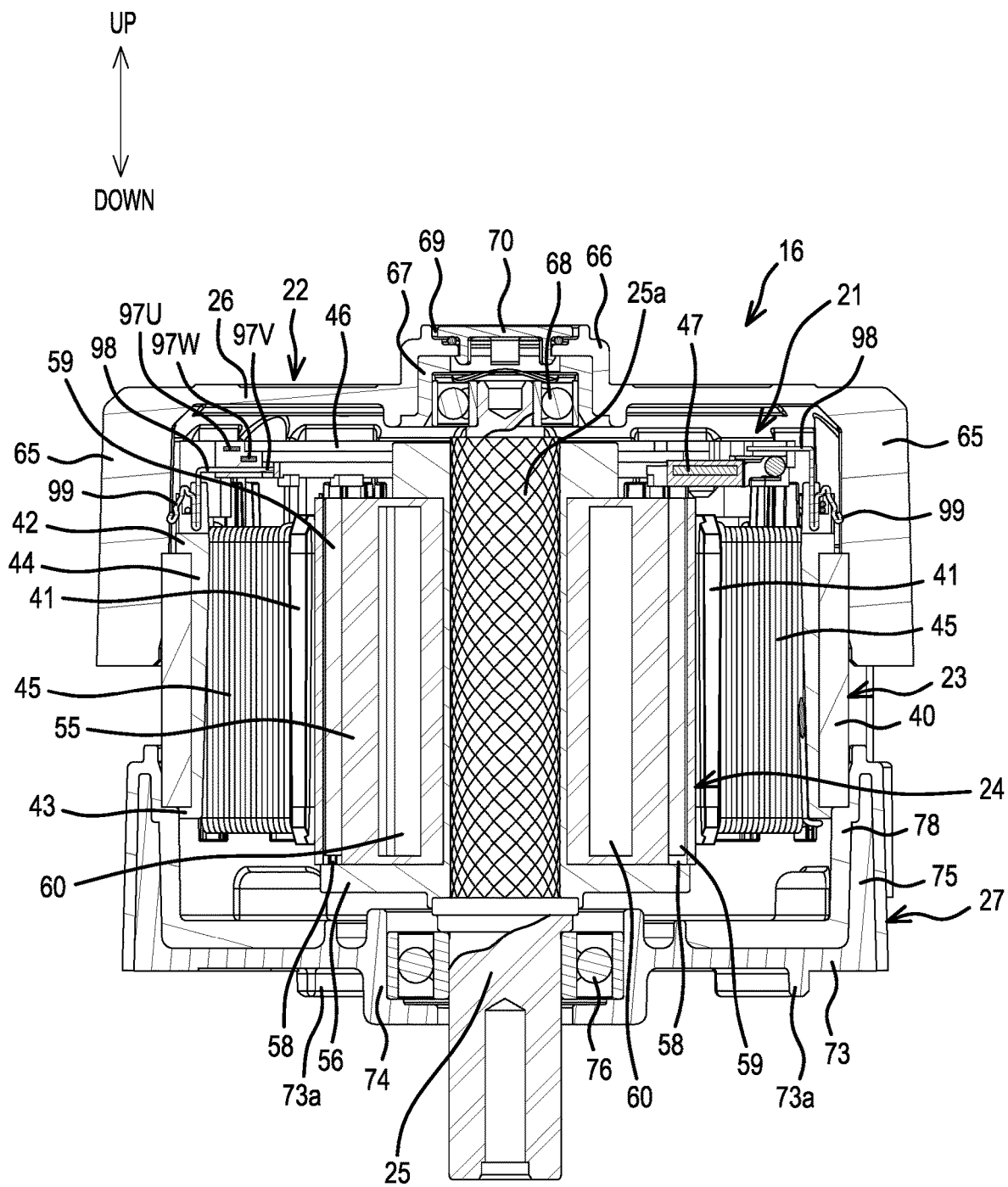
FIG. 5 is a longitudinal, cross-sectional view of the motor unit.
Figure 6:
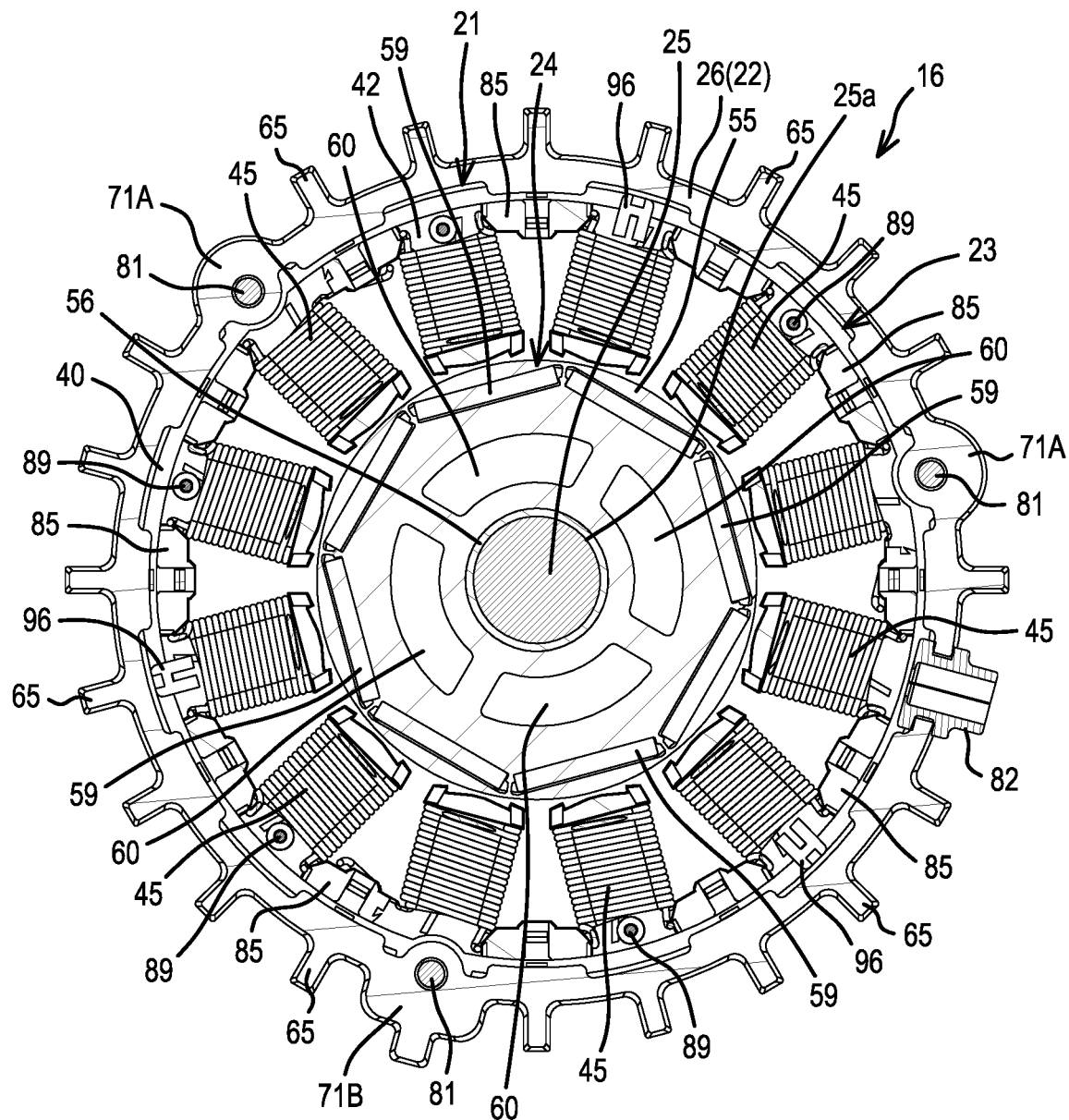
FIG. 6 is a transverse, cross-sectional view of an upper-case portion of the motor unit.
Figure 7:
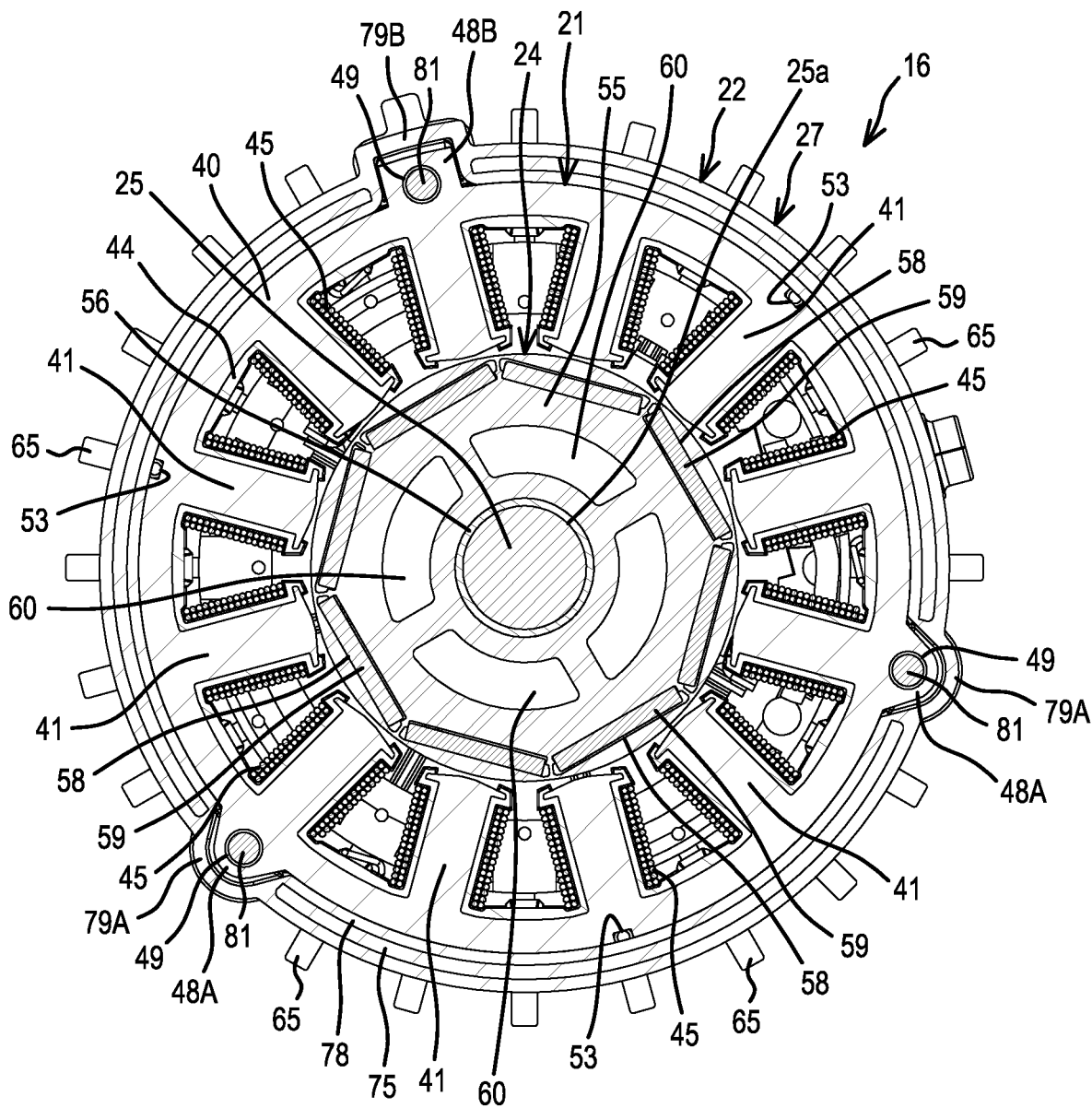
FIG. 7 is transverse, cross-sectional view of a lower-case portion of the motor unit.

As shown in FIG. 5, a diamond knurl 25a or other type of knurling or gripping pattern may be formed on the outer circumference of the rotary shaft 25 along all or only a portion of the length of the rotary shaft 25 that contacts the resin 56. The knurl 25a provides an unevenness or roughness that is formed, e.g., in a lattice or grid shape on the outer-circumferential surface of the rotary shaft 25. The knurl 25a acts as a rotation-impeding part and/or a slippage-impeding part, because the knurl 25a enables the resin 56 to securely grip the rotary shaft 25, so that no rotation of the rotary shaft 25 relative to the resin 56 is possible and/or so that no axial slippage/movement of the rotary shaft 25 relative to the resin 56 is possible. The knurl 25a shown in FIG. 5 is merely one example of an uneven surface that can perform one or both of the rotation-impeding function and/or the axial slippage-impeding function, and additional examples will be provided below.

In addition, multiple (here, eight) magnet holes 58 are concentrically formed in a circumferential-edge part of the rotor core 55 such that they pass through in the axial direction thereof. Plate-shaped permanent magnets 59 are embedded (inserted) in the magnet holes 58. By forming through holes in the steel plates 40a, except at the upper and lower ends, that are aligned in the axial direction, spaces (cutouts, voids) 60 are formed radially inward of the permanent magnets 59, which reduces the weight of the rotor 24.

Explanation of a Representative Motor Case

The upper case 26 and the lower case 27 of the motor case 22 are each circular-cup-shaped and cover an upper part and a lower part, respectively, of the stator 23.

The upper case 26 is formed of a nonmagnetic material, e.g., a metal such as an aluminum alloy. As shown in FIGS. 3-5, fins 65 for dissipating heat are provided, from the upper surface of the outer circumference down along the side surface of the upper case 26 and extending in the up-down direction, at prescribed spacings in the circumferential direction. In addition, an upper-bearing retaining part 66 is formed at the center of the upper surface of the upper case 26. A bearing 68 is held in the upper-bearing retaining part 66 by an insulating cap 67, which is made of resin or polymer, and rotatably supports an upper end of the rotary shaft 25. A pass-through hole 69 is formed at the center of the upper-bearing retaining part 66 and is closed up by a resin or polymer cap 70.

The resin or polymer of the insulating cap 67 and the resin cap 70 may be selected from any of the resins described above with regard to resin 56, which description is equally applicable to the insulating cap 67 and resin cap 70.

Furthermore, three screw-boss parts 71A, 71A, 71B, which project radially outward, are formed on the circumferential surface of the upper case 26 such that they extend in the up-down direction and are equispaced in the circumferential direction. The screw-boss parts 71A, 71B correspond to the ridges 48A, 48B of the stator core 40. In particular, the lower ends of the screw-boss parts 71A, 71B are open and have either a tapered shape in transverse cross section or a quadrilateral shape in transverse cross section that mates with the respective ridges 48A, 48B. A slit 72, which extends upward from a lower end of the upper case 26, is formed in or on the circumferential surface of the upper case 26 between the ridges 48A, 48B.

Turning now to the lower case 27, it comprises a circular-shaped end surface part 73, in which a lower-bearing retaining part 74 is formed at the center, the same as in the upper case 26. A tubular part 75 rises upward from the outer circumference of the end surface part 73. A bearing 76 is held by the lower-bearing retaining part 74 and supports the rotary shaft 25, which passes through the lower-bearing retaining part 74. Bosses 77 for fastening screws to the mounting base 28 are formed on the outer circumference of the tubular part 75 so as to point downward at four locations equispaced in the circumferential direction.

In addition, a resin layer 78 is formed on (joined to) an inner surface of the end surface part 73 (except for the lower-bearing retaining part 74), an inner circumference of the tubular part 75, and an outer circumference of the tubular part 75 (except for on the bosses 77), such that the resin layer 78 continuously covers from the inner surface of the end surface part 73 to the inner circumference and then to the outer circumference of the tubular part 75. Boss parts 79A, 79B have shapes the same as the corresponding screw-boss parts 71A, 71B of the upper case 26, and are formed, extending in the axial direction, at locations of the resin layer 78 corresponding to the ridges 48A, 48B of the stator core 40. Through holes, which have tapered shapes in transverse cross section or quadrilateral shapes in transverse cross section and mate with the respective ridges 48A, 48B, are formed in the upper ends of the boss parts 79A, 79B. Furthermore, recessed grooves 80 are formed continuously on the lower sides of the boss parts 79A, 79B.

Again, the resin of the resin layer 78 may be selected from any of the resins or polymers described above with regard to resin 56, which description is equally applicable to the resin layer 78.

Thus, the upper case 26 of the motor case 22 is placed onto the upper portion the stator 23 by aligning the ridges 48A, 48B of the stator core 40 with the respective screw-boss parts 71A, 71B of the upper case 26 and then inserting the ridges 48A, 48B into the corresponding screw-boss parts 71A, 71B. The upper bearing 68, which is joined to the upper end of the rotary shaft 25 of the rotor 24, is held by the upper-bearing retaining part 66. On the other side, the lower case 27 placed on the lower portion of the stator 23 by aligning the ridges 48A, 48B of the stator core 40 with the boss parts 79A, 79B of the lower case 27 and then inserting the ridges 48A, 48B into the corresponding boss parts 79, 79B. The lower bearing 76, which is joined to the lower end of the rotary shaft 25, is held by the lower-bearing retaining part 74. In this assembled state, screws 81 are inserted, from below, into the boss parts 79A, 79B of the lower cases 27, then passed through the ridges 48A, 48B, and are screwed into the screw-boss parts 71A, 71B of the upper case 26. As a result, the brushless motor 21 is covered by the upper case 26 and the lower case 27, except for an intermediate portion of the outer circumference of the stator core 40, and thereby the motor unit 16 is obtained.

In this state, the brushless motor 21 contains a basic-insulation member (the upper and lower insulators 42, 43 and the insulation part 44, which are integrally formed), which is interposed between the stator core 40, which has a metal interior, and the coils 45, which are energized (supplied with current) during operation of the brushless motor 21.

In addition thereto, supplementary electrical insulation is provided by: (i) the resin 56, which serves as an insulating member on the rotary-shaft side and is interposed between the rotary shaft 25 and the rotor core 55, (ii) the insulating cap 67, which is interposed between the upper case 26 and the rotary shaft 25, and (iii) the resin layer 78, which is interposed between the tubular part 75 of the lower case 27 and the stator core 40. Therefore, the space between the stator core 40 and the rotary shaft 25 is double insulated. In addition, by providing an adjustable gap in the up-down direction between the upper case 26 and the lower case 27, assembly of the motor unit 16 is not negatively influenced even if the dimension (length) of the stator 23 in the axial direction changes.

When the motor unit 16 is placed, with the rotary shaft 25 facing downward, on the mounting base 28 and screws are screwed into the bosses 77 from below the mounting base 28, the motor unit 16 is fixed to the mounting base 28. Concentric arcuate ribs 73a (FIGS. 2, 5), which mate with the tubular part 11 to position the motor unit 16, are formed on the lower surface of the end surface part 73 of the lower case 27.

In the present embodiment, when the motor cover 29 is put on, the motor unit 16 is mostly covered while a center portion of the upper case 26 that includes the upper-bearing retaining part 66 is exposed. In this state, the fins 65 of the upper case 26 are proximate to the inner surface of the motor cover 29.

Furthermore, the stator 23 of the brushless motor 21 is impeded (blocked) from rotating relative to the motor case 22 by the screws 81, which pass through the ridges 48A, 48B, and also by the screw-boss parts 71A, 71B of the upper case 26 and the boss parts 79A, 79B of the lower case 27, which respectively mate with (engage) the ridges 48A, 48B.

Explanation of Representative Upper and Lower Insulators

Figure 9:
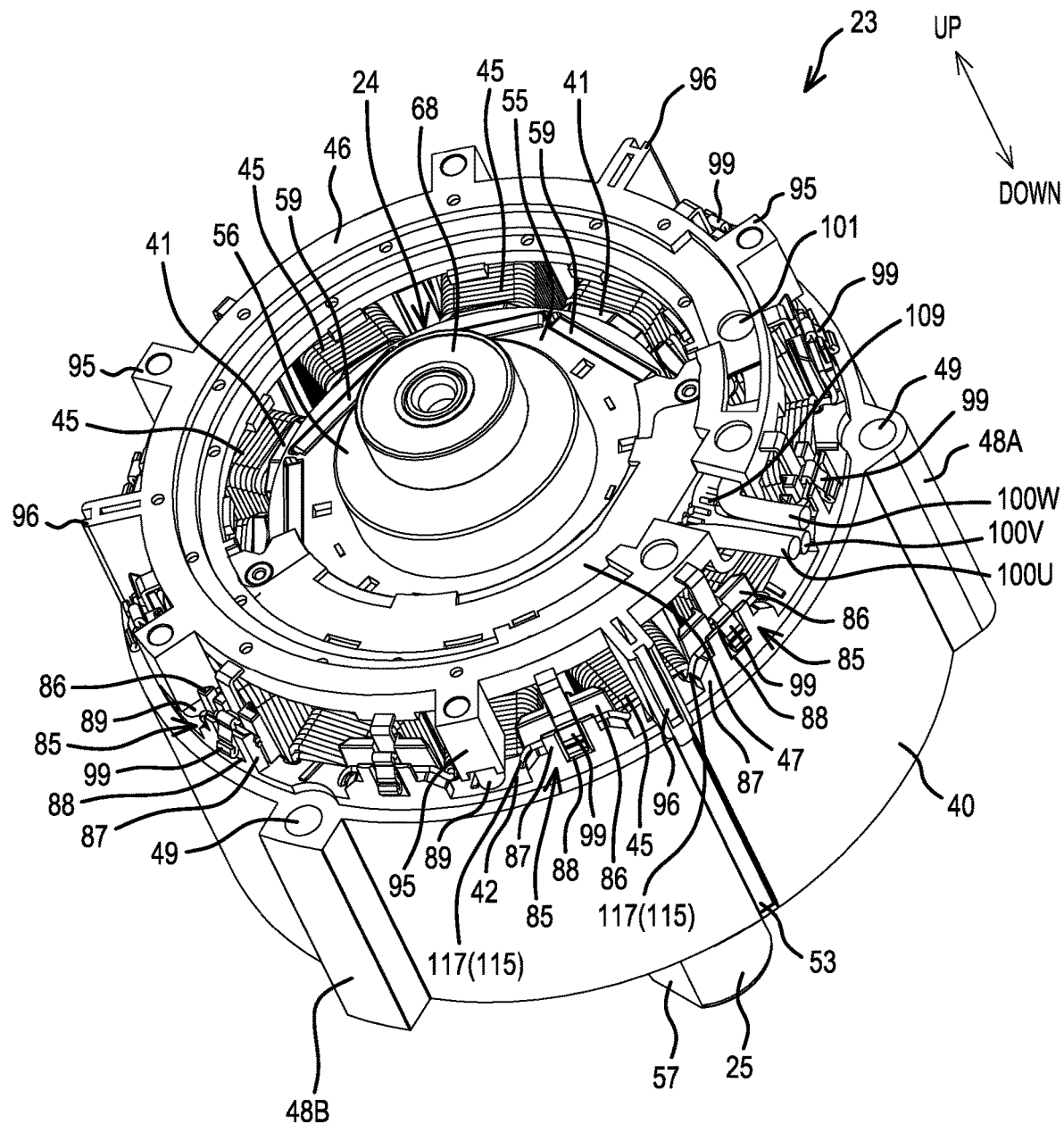
FIG. 9 is an oblique view of a brushless motor according to the present teachings.
Figure 10:
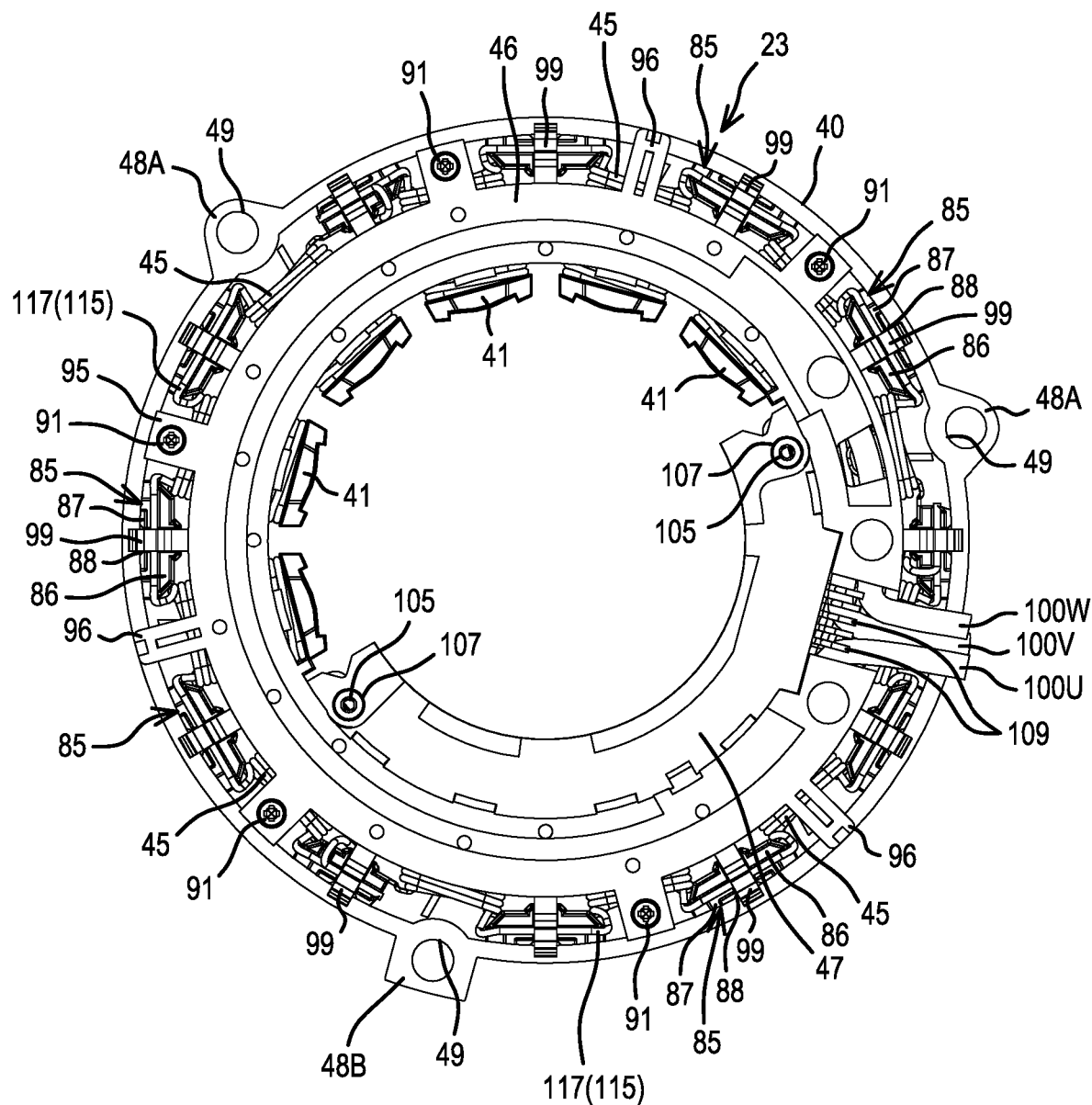
FIG. 10 is a plan view of a stator of the brushless motor.

Referring now to FIGS. 9 and 10, the upper insulator 42 is a ring body that is integrally formed on (joined to) an upper-side end surface of the stator core 40. Twelve terminal-holding parts 85, which respectively hold fusing terminals 99 provided on the short-circuiting member 46, are provided on an upper surface of the upper insulator 42 equispaced in the circumferential direction. In each of the terminal-holding parts 85, an inner-wall part 86 on the inner-circumference side and an outer-wall part 87 on the outer-circumference side extend vertically and are spaced apart radially by a spacing (distance) that substantially corresponds to the diameter of wires 115. A mating groove 88, which mates with its corresponding fusing terminal 99, is formed between the inner-wall part 86 and the outer-wall part 87 at the center in the circumferential direction. In addition, stop bosses 89 for joining to (attaching) the short-circuiting member 46 protrude from the upper surface of the upper insulator 42 at five locations, i.e., at locations at which they contact the base of every other tooth 41.

Figure 11:
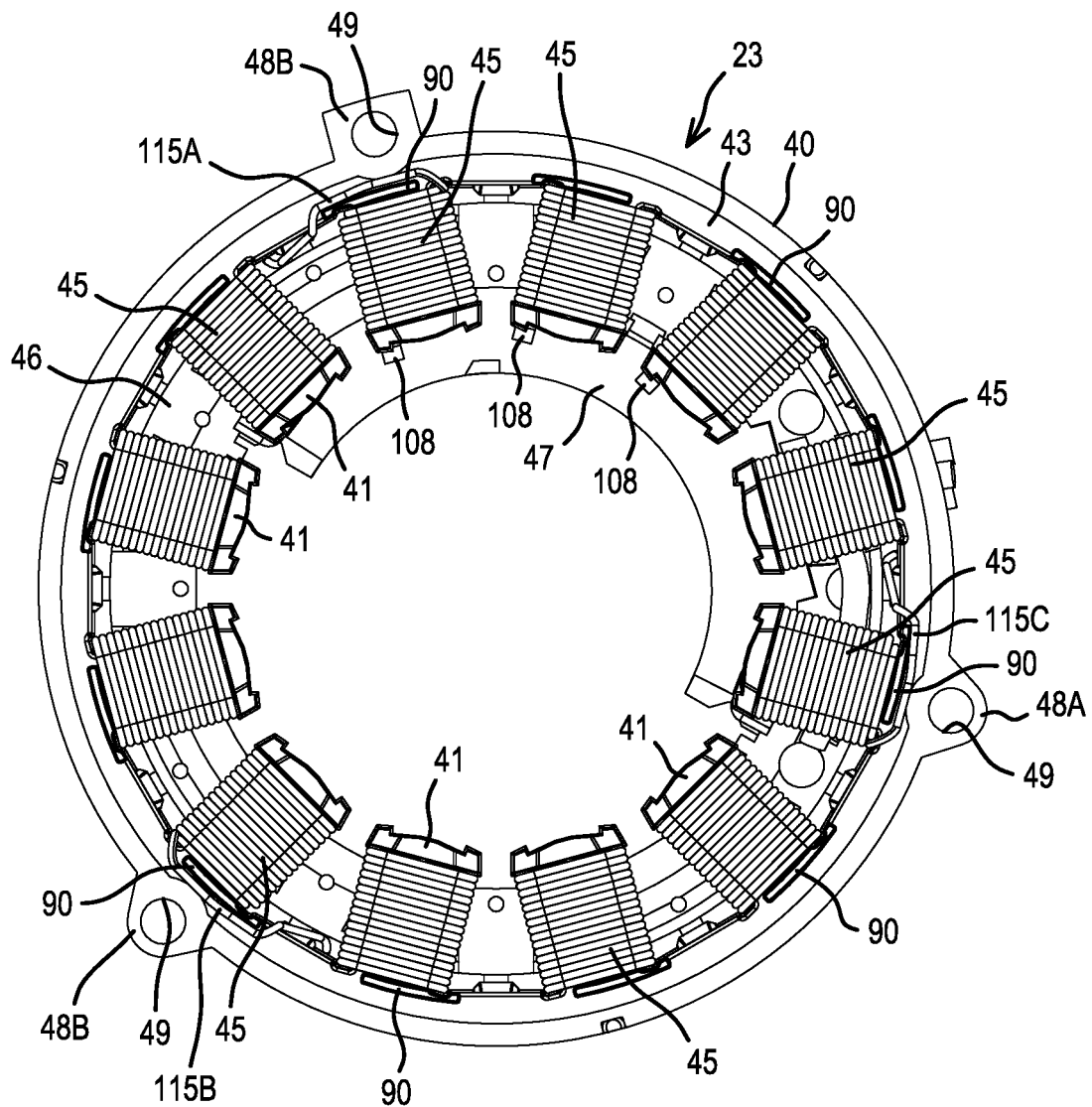
FIG. 11 is a bottom view of the stator.

As shown in FIG. 11, the lower insulator 43 is a ring body that is integrally formed on (joined to) the lower-side end surface of the stator core 40. Twelve vertically-extending guide walls 90 are provided along the circumferential direction on the lower surface of the lower insulator 43 at locations slightly shifted in the circumferential direction from the bases of the teeth 41.

Explanation of a Representative Short-Circuiting Member and Sensor Circuit Board Still referring to FIGS. 9-10, the short-circuiting member 46 includes a ring body made of resin, polymer, etc. and has a circumference that is smaller than the circumference of the upper insulator 42. Five mating bosses 95, which are quadrilateral-tube-shaped and respectively mate, from above, with the stop bosses 89 of the upper insulator 42, and three ribs 96, which respectively engage with the grooves 53 of the stator core 40, protrude from the outer circumference of the short-circuiting member 46.

Figure 12:
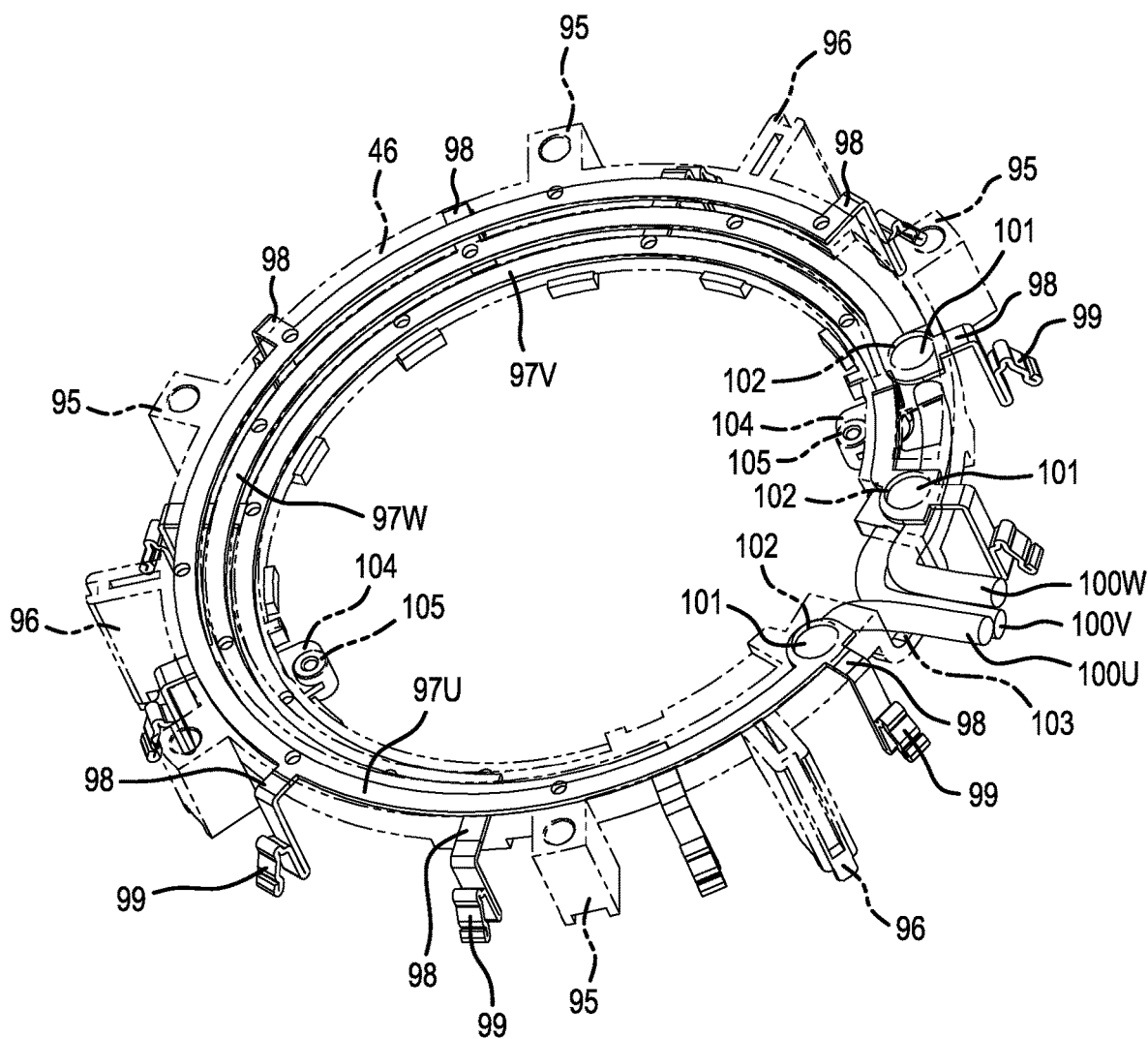
FIG. 12 is an oblique view of a short-circuiting member (first to third metal fittings alone are indicated by solid lines).
Figure 13:
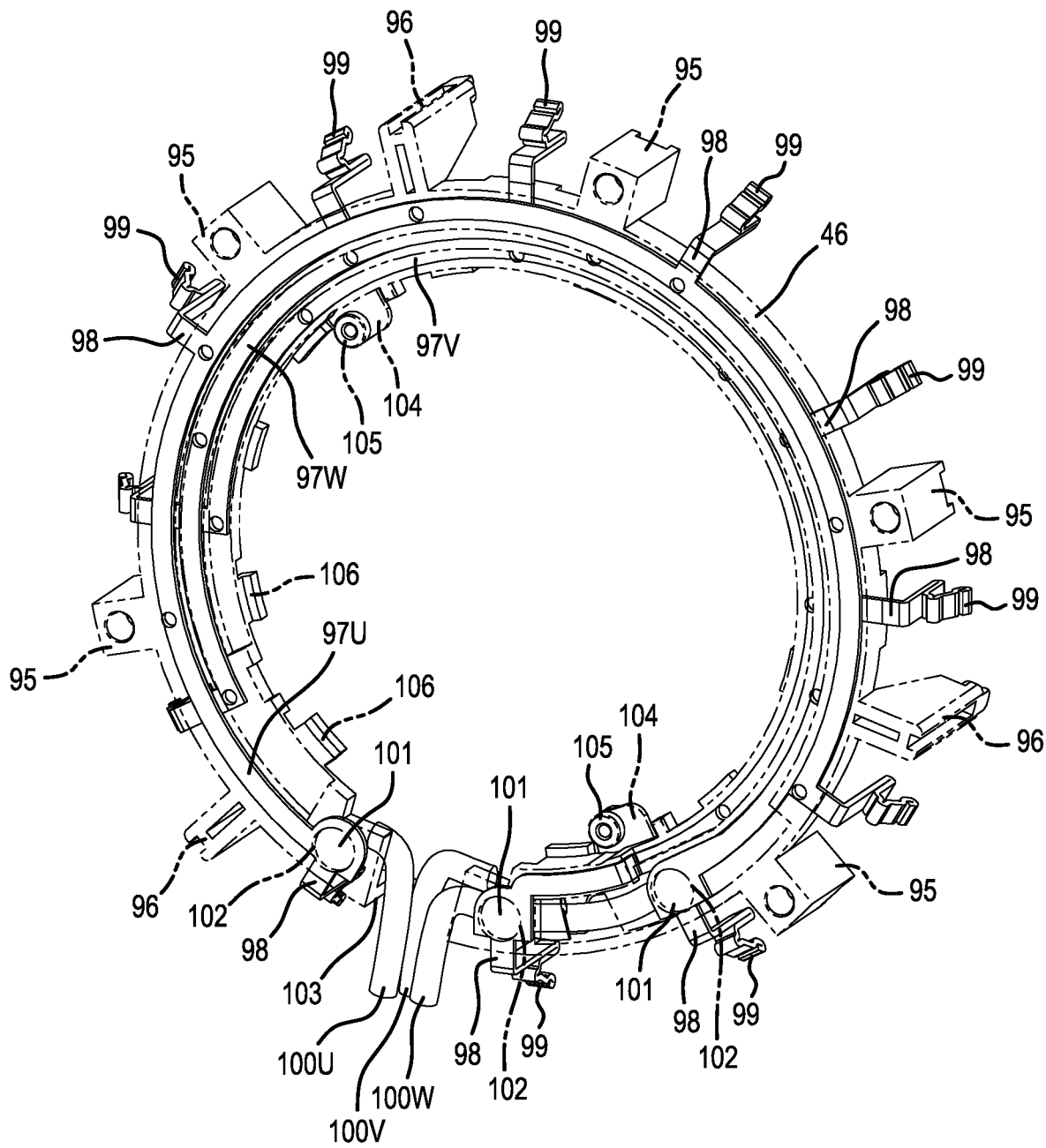
FIG. 13 is another oblique view of the short-circuiting member (first to third metal fittings alone are indicated by solid lines).
Figure 14:
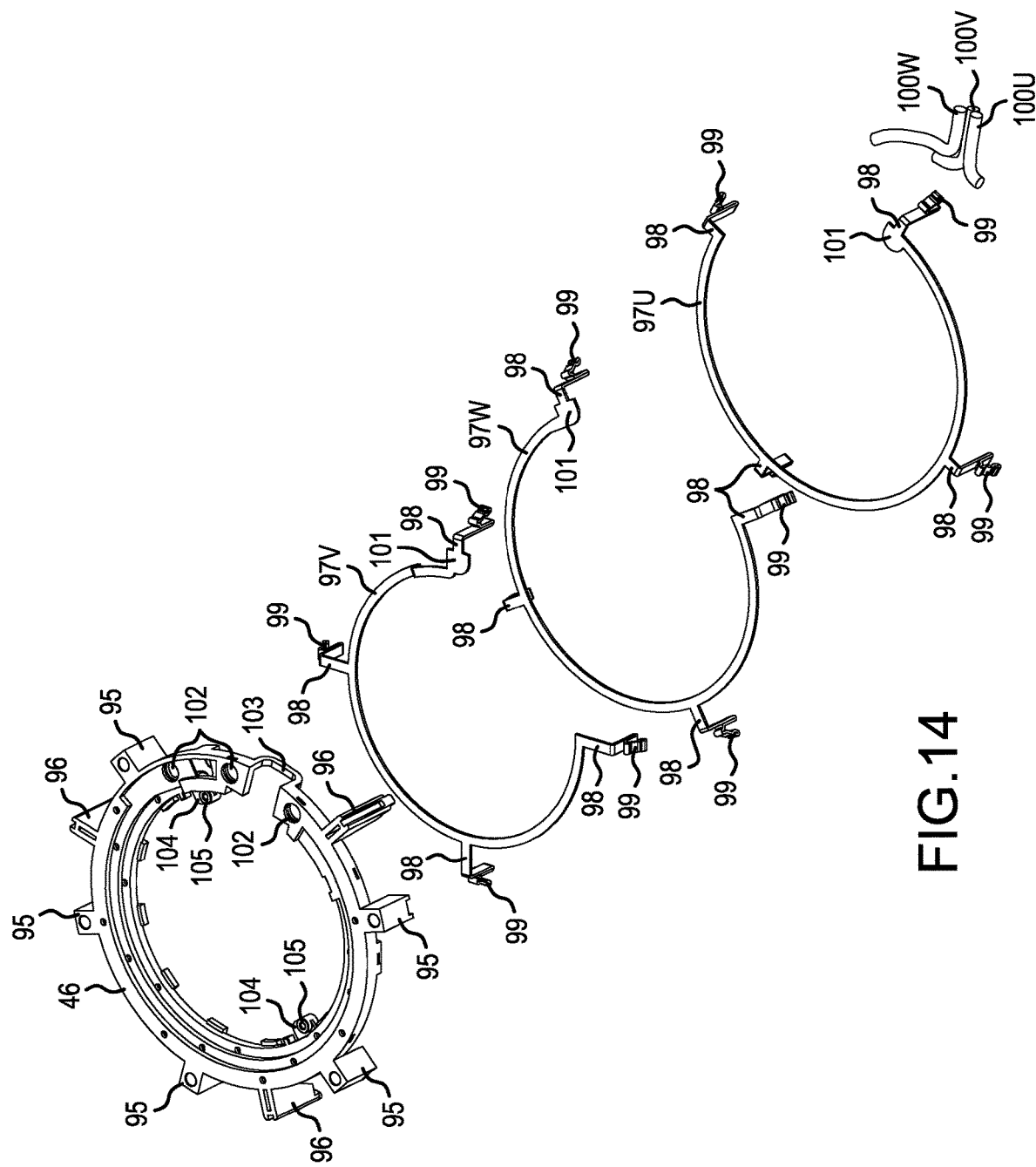
FIG. 14 is an exploded oblique view of the short-circuiting member.

In addition, the short-circuiting member 46 is formed in steps such that its thickness in the axial direction becomes smaller in steps, starting from the upper surface, from the outer circumference toward the inner circumference. Furthermore, as shown in FIGS. 12-14, a first metal fitting 97U having the maximum diameter and that is located in an outer-circumferential portion having the greatest wall thickness, a second metal fitting 97W having an intermediate diameter and that is located in an intermediate-wall-thickness portion on the inner side thereof, and a third metal fitting 97V having the minimum diameter and that is located in an inner-circumference portion on the inner side thereof are concentrically disposed in the thickness portions and insert molded. The letters U, W, and V appended to the metal fittings indicated the corresponding phases of the three-phase current: U phase, W phase, and V phase.

Each of the first to third metal fittings 97U-97V is a strip-shaped, curved plate having a substantially C shape in plan view. Protruding pieces 98 protrude radially outward at four locations, namely, at both ends and at locations point symmetric with the two ends of the metal fittings 97U-97V. One of the fusing terminals 99 is formed at the tip of each protruding piece 98 by first bending it downward, then folding it upward, and further bending it outward. A welding part 101 for spot welding a power-supply line 100U is formed at the base of the protruding piece 98 on (at) one end of the first metal fitting 97U. In addition, welding parts 101 for spot welding power-supply lines 100W, 100V are formed on (at) the bases of the protruding pieces 98 of the second and third metal fittings 97W, 97V on (at) the ends on the side opposite that of the first metal fitting 97U.

In the state in which the first to third metal fittings 97U-97V are disposed and insert-molded inside the resin ring body of the short-circuiting member 46, starting from above, in the order of the first metal fitting 97U, the second metal fitting 97W, and the third metal fitting 97V, such that their phases are shifted by a prescribed angle in the circumferential direction, the fusing terminals 99 respectively protrude from the outer-circumferential surface of the short-circuiting member 46 without contacting each other and are substantially equispaced in the circumferential direction. Pass-through holes 102, which respectively expose the welding parts 101 of the metal fittings 97U-97V, are formed in the short-circuiting member 46 such that the pass-through holes 102 are offset by prescribed spacings in one portion in the circumferential direction. The power-supply lines 100U-100V are respectively spot welded to the welding parts 101. A notch 103 for drawing the power-supply lines 100U-100V to the outer side is formed between two of the welding parts 101 such that only the lower side of the short-circuiting member 46 is connected to (via) the notch 103.

In addition, support pieces 104, which comprise mount bosses 105 for mounting the sensor circuit board 47, radially inwardly protrude from the inner circumference of the short-circuiting member 46 at point-symmetric positions. Support pieces 106 (FIG. 13), which support the outer circumference of the sensor circuit board 47, radially inwardly protrude from the inner circumference of the short-circuiting member 46 between the support pieces 104.

As shown in FIG. 10, the sensor circuit board 47 has an arcuate strip shape that extends around the inner side of the short-circuiting member 46. Mating holes 107, which respectively mate with the mount bosses 105 of the support pieces 104, are formed on both circumferential ends of the sensor circuit board 47. Because the mount bosses 105 mate with the mating holes 107 and the outer circumference of the sensor circuit board 47 is supported by the support pieces 106, the sensor circuit board 47 is held on the inner-circumference side of the short-circuiting member 46. Rotation-detection devices 108 (FIG. 11), such as Hall-effect devices, which detect the magnetic fields of the permanent magnets 59 provided on the rotor 24, are installed on a back surface of the sensor circuit board 47. Signal lines 109, which are connected to the sensor circuit board 47, and the power-supply lines 100U-100V are drawn through the notch 103 of the short-circuiting member 46 to the outer side. This drawn-out position corresponds to the slit 72 provided in the upper case 26 of the motor case 22.

When the five mating bosses 95 on the outer circumference are mated with the stop bosses 89, which are provided on the upper surface of the upper insulator 42, and are screwed to the stop bosses 89 from above using screws 91 (FIG. 10), and when the tips of the three ribs 96 are engaged with the grooves 53 of the stator core 40, and the fusing terminals 99 are caused to be held by the terminal-holding parts 85 of the upper insulator 42, the short-circuiting member 46 is joined, together with the sensor circuit board 47, to the stator 23. In particular, because the ribs 96 engage with and hold fast to the grooves 53 at three locations, the ribs 96 function as anchors that stably support the short-circuiting member 46. The power-supply lines 100U-100V and the signal lines 109 are drawn out from the slit 72, which is provided in the upper case 26, to the exterior through a sleeve-shaped gasket 82 (FIG. 3), which is fitted into the slit 72.

Explanation of a Representative Coil-Forming Method

Figure 15:
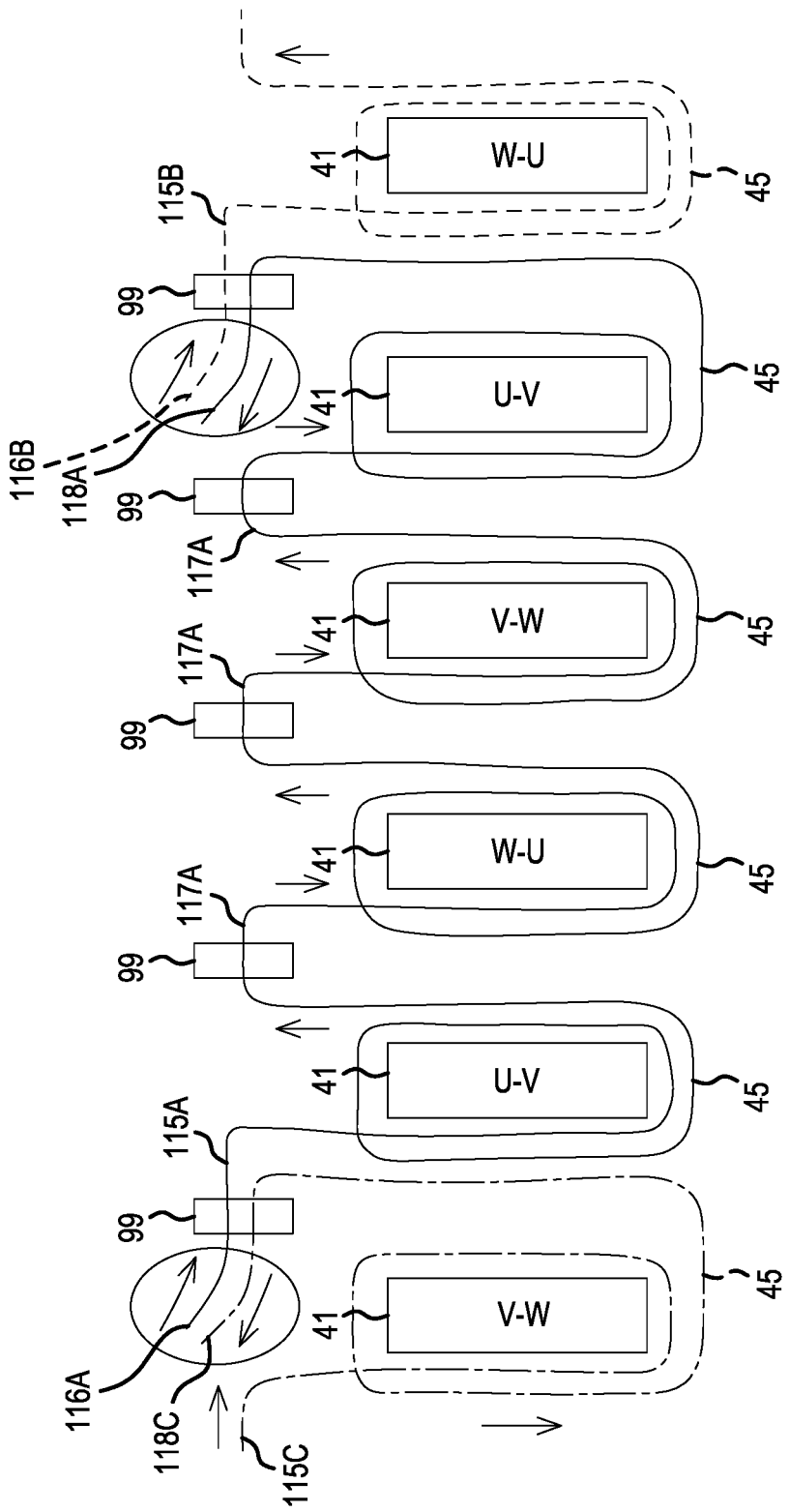
FIG. 15 is a diagram for explaining a coil winding method.

Twelve of the coils 45 herein are formed at the same time, using three winding nozzles, by starting windings, using a single wire 115 as shown in FIG. 15 (however, when distinguishing wires, the symbols A-C are appended, as in 115A, 115B, 115C, and the same applies to other portions hereinbelow) on three of the teeth 41 located at 120° spacings, and winding, in order, the four teeth 41 adjacent in the circumferential direction of the stator 23. For example, with regard to the wire 115A shown in FIG. 15, after a start end 116A has been initially latched (attached) to the corresponding fusing terminal 99, the coils 45 are formed, in order, on the teeth 41 adjacent in the clockwise direction. The winding direction at this time is the counterclockwise direction, facing the teeth 41. In addition, a crossover wire 117A after forming each coil 45 returns to the upper insulator 42 side (wiring-connection side) and latches (attaches) to the fusing terminal 99 between two of the teeth 41, 41.

Furthermore, after the fourth coil 45 has been formed, as shown in FIG. 11, the wire 115A is first drawn out to the lower insulator 43 side (opposite wiring-connection side) and wound from the outer side of the guide wall 90 at the base of the tooth 41 being wound, after which the wire 115A once again returns to the upper insulator 42 side, is latched (attached) to the fusing terminal 99 to which a start end 116B of the separate adjacent wire 115B is latched, and becomes a terminal end 118A, as shown in FIG. 15. Thereupon, the orientation of the start end 116B of the separate wire 115B and the orientation of the terminal end 118A are made to coincide and can be simultaneously cut at the portion at which they are completely surrounded. This applies likewise for a terminal end 118B of the wire 115B and the start end 116A of the wire 115C, as well as a terminal end 118C of the wire 115C and the start end 116A of the wire 115A.

Figure 16:
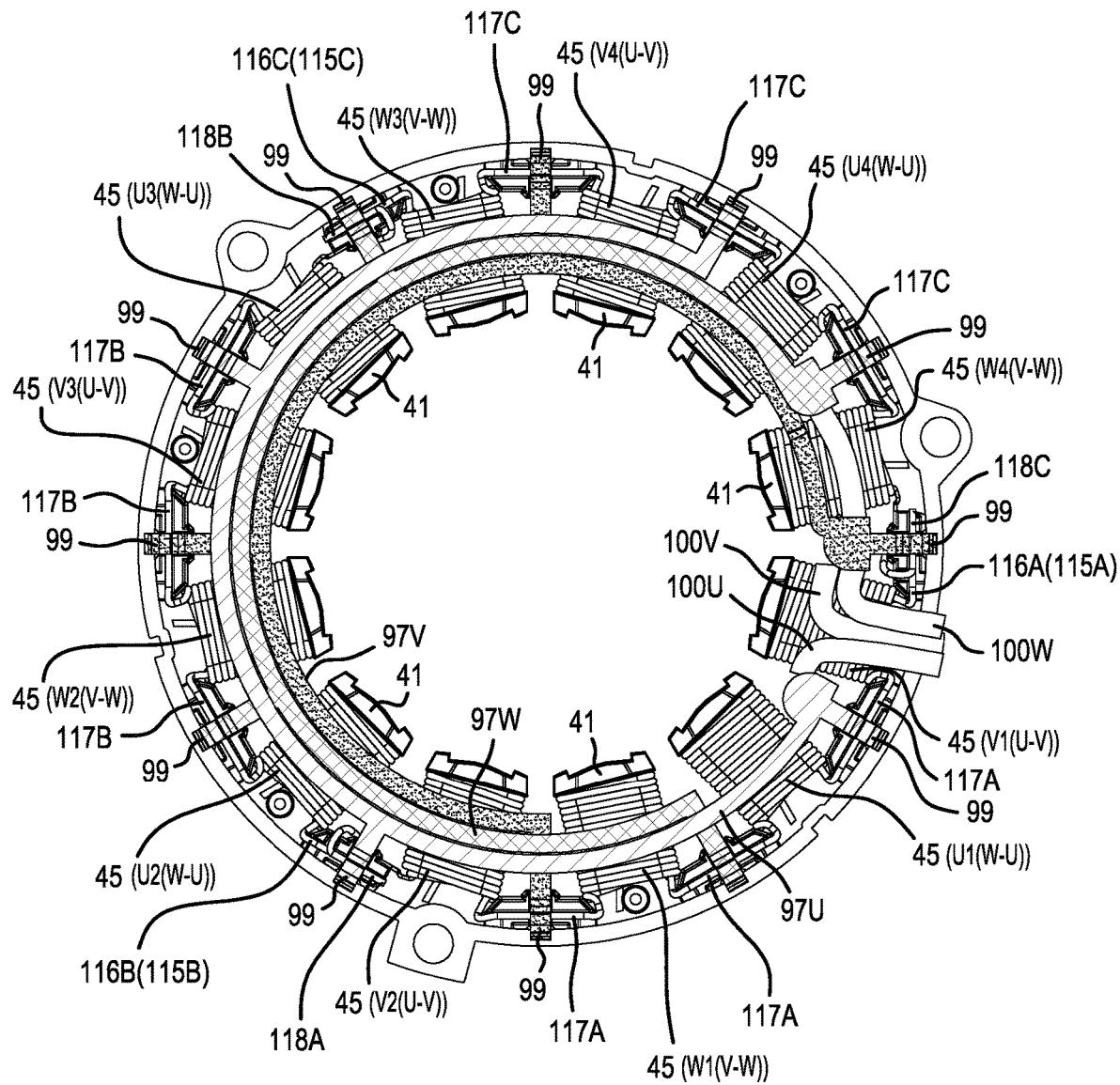
FIG. 16 is an explanatory diagram in which a wiring state created by the first to third metal fittings is viewed from the plane of the stator.

The first to third metal fittings 97U-97V of the short-circuiting member 46 are disposed such that their phases are shifted in the circumferential direction one coil 45 at a time. As shown in FIG. 16, crossover wires 117A-C, which are disposed between the twelve coils 45, are each fused with respect to three adjacent coils 45. In FIG. 16, to make it easy to distinguish the crossover wires 117A-C to which the metal fittings 97U-97V are fused, linear hatching is applied to the first metal fitting 97U, cross hatching is applied to the second metal fitting 97W, and dots are applied to the third metal fitting 97V.

Figure 17:
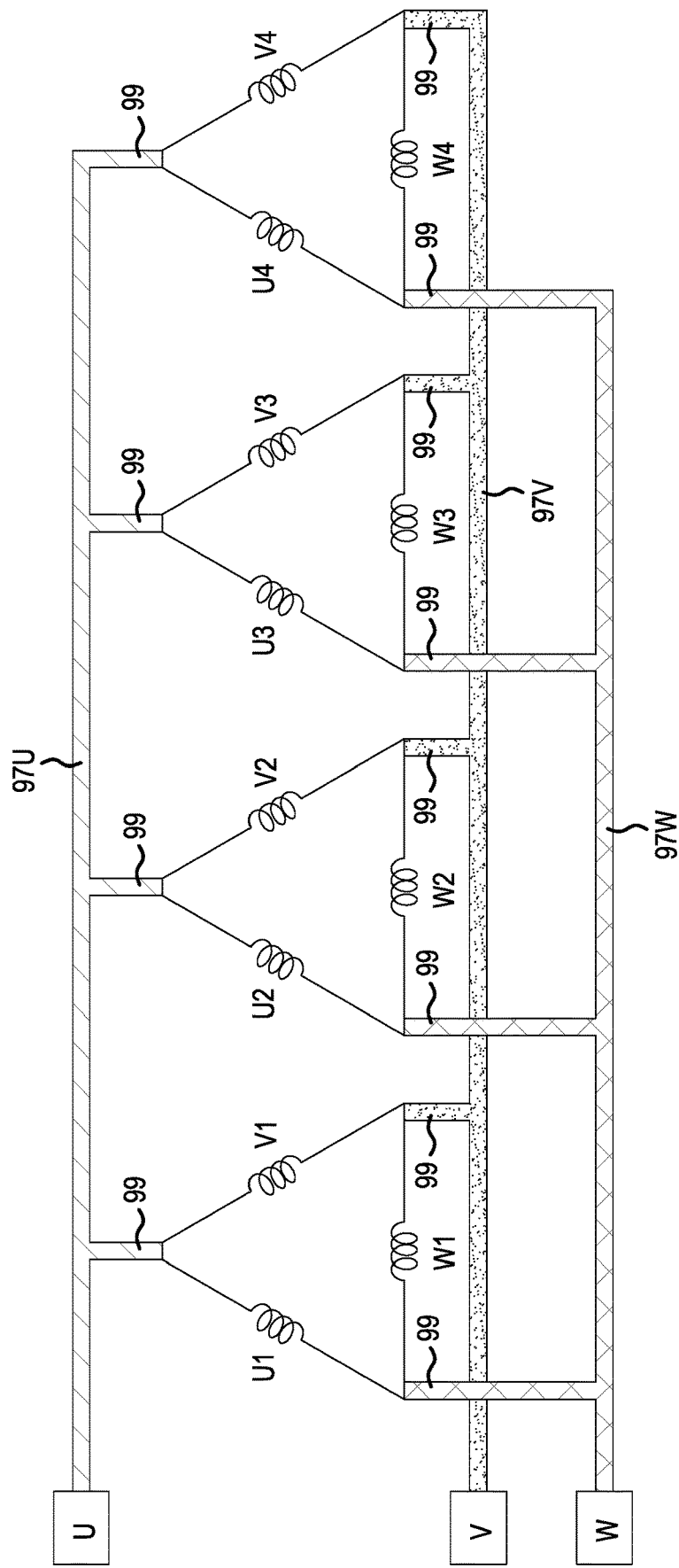
FIG. 17 is a wiring circuit diagram of the first to third metal fittings.

Thus, the three coils 45 adjacent in the circumferential direction are configured as a delta connection of U (W-U), V (U-V), W (V-W) phases by the first to third metal fittings 97U-97V of the three phases. This is because four sets are sequentially arranged in parallel by the first to third metal fittings 97U-97V; and the three-phase circuit herein is formed as shown in FIG. 17. This is equivalent to a delta connection in which the four coils U1-U4, V1-V4, W1-W4 of each of the U, V, and W phases are connected in parallel.

Operation of the Representative Lawn Mower

In the lawn mower 1 configured as described above, when the switch lever 8 is unlocked by pressing the lock-OFF button 9 and the switch lever 8 is pulled, a main switch turns ON and an ON signal is transmitted from the battery pack 13 to the control circuit board of the controller 15. A microcontroller of the control circuit board acquires the rotational state of the rotor 24 based on detection signals obtained from the rotation-detection devices 108 of the sensor circuit board 47, turns ON/OFF switching devices, which are provided on the control circuit board, in accordance with the acquired rotational state, and supplies electric current, in order, to the coils 45, for each phase, of the stator 23, and thereby rotates the rotor 24. Thus, when the rotary shaft 25 rotates and causes the spindle 17 to rotate together with the cutting blade 20, and when the base 2 is pushed using the handle 4, it becomes possible to cut grass with the cutting blade 20 while the lawn mower 1 travels via the wheels 5.

At this time, the stator 23 of the brushless motor 21 is impeded (blocked) from rotating relative to the motor case 22, which is joined to the mounting base 28, by the screws 81 that pass through the ridges 48A, 48B. Therefore, any effects caused by manufacturing tolerances are small and it becomes possible to impede (block) relative rotation of the brushless motor 21 and the motor case 22 with good accuracy. In addition, high strength is also obtained. In particular, because the screws 81 pass directly through the stator core 40, flexure tends not to occur on the outer side of the stator core 40, as compared with a structure that couples upper and lower cases of a motor case using screws that do not pass through the stator core.

Furthermore, because the wires 115 that form the coils 45 do not cross one another, scraping of the wires 115 caused by contacting each other tends not to occur, and therefore durability is also increased.

Furthermore, in the rotor 24, because the diamond knurl 25a is provided on the outer circumference of the rotary shaft 25, the bite or grip of the resin 56 is increased, thereby reducing or minimizing slippage in the rotational direction and the axial direction. Consequently, the integration (secure attachment) of the rotary shaft 25 and the rotor core 55 is maintained even if the load on the rotary shaft 25 produced by the rotation of the cutting blade 20 becomes large.

Advantages of the Representative Stator Core

In the lawn mower 1 of the above-mentioned embodiment, screw members (the screws 81) pass through the stator core 40 of the brushless motor 21 and furthermore, the through holes 49 are formed to impede (block) the relative rotation of the stator 23. Therefore, it is possible to impede (block) relative rotation of the stator 23 using the stator core 40, which has high accuracy and high strength, instead of by using the upper and lower insulators 42, 43 to impede (block) relative rotation. Thereby, the stator 23 can be impeded (blocked) from rotating relative to the motor case 22 with high accuracy and high strength.

In addition, because cover members (the upper case 26 and the lower case 27) are provided on both ends of the stator 23 in the axial direction in the present embodiment, and because the rotation-impeding parts (the ridges 48A, 48B), which mate with the upper case 26 and the lower case 27, are provided on the outer circumference of the stator core 40, rotation of the stator 23 relative to the motor case 22 can be impeded (blocked), using the stator core 40, with high accuracy and high strength.

Furthermore, because protruding parts (the ridges 48A, 48B) for impeding relative rotation by engaging with the cover members (the upper case 26 and the lower case 27) are formed on the outer circumference of the stator core 40, and because the through holes 49, which are provided for the screws 81 to pass through, are formed in the ridges 48A, 48B, rotation of the stator 23 relative to the motor case 22 can be impeded (blocked), using the ridges 48A, 48B and the screws 81, with high accuracy and high strength.

Furthermore, because the ridges 48A, 48A have a tapered shape in transverse cross-section such that the width in the circumferential direction gradually narrows toward the outer side in the radial direction of the stator core 40, interference with the split molds 54 can be prevented when the upper and lower insulators 42, 43 and the insulation part 44 are being integrally formed.

It is noted that, in the stator core, the number, shape, or the like of the ridges that impede (block) relative rotation of the stator is not limited to the above-mentioned embodiment. For example, the number of ridges can be increased or decreased, the transverse-cross-sectional shape can be modified where appropriate, or the like. In another modified example, the ridges do not necessarily have to be provided across the entire up-down length of the stator core and may instead be provided across a distance shorter than the overall length, such as an upper-end side, a lower-end side, an intermediate region, or the like. Relative rotation can also be impeded (blocked) by passing the screw members through the stator core, without providing the ridges.

Figure 18:
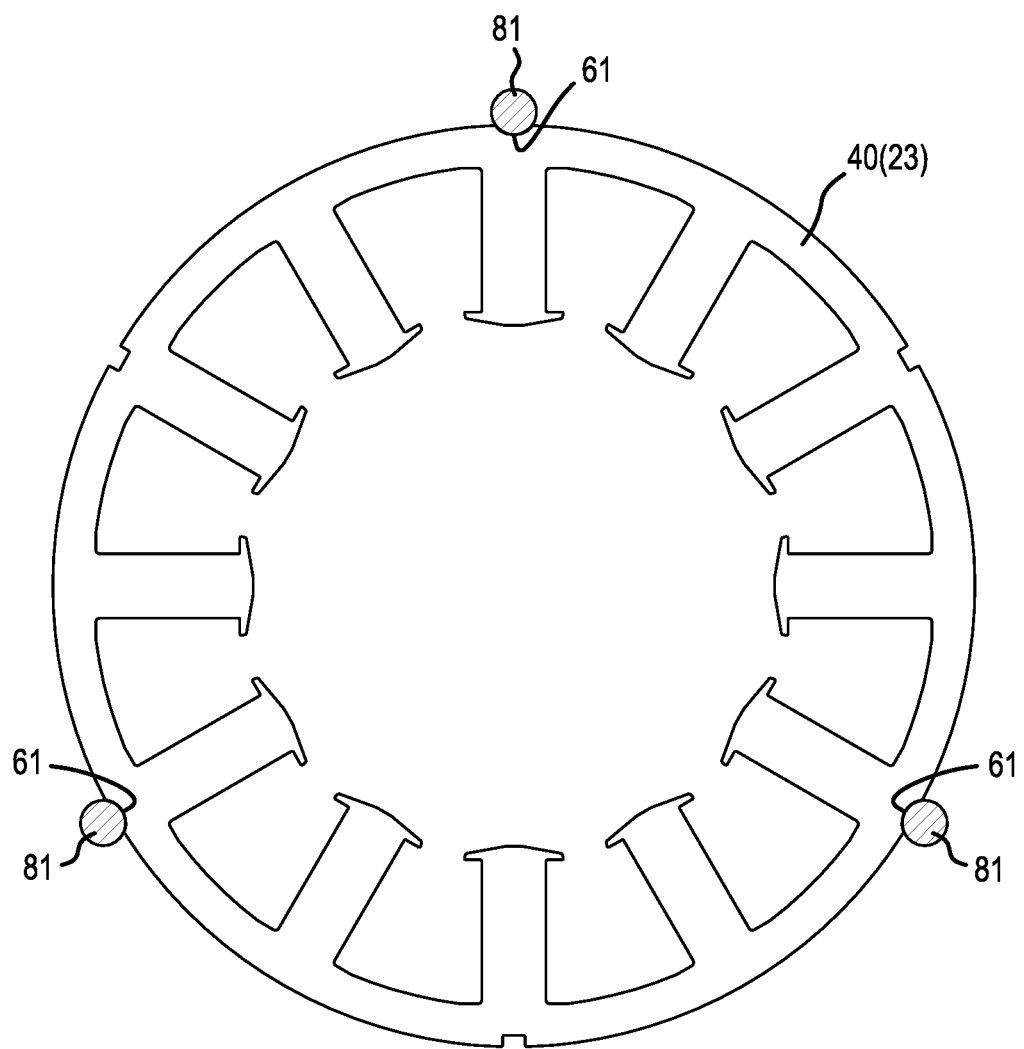
FIG. 18 is an explanatory diagram of a modified example of a relative rotation impeding part of the stator.

In addition, the rotation-impeding function is not limited to being effected by the ridges, the through holes, and the like. For example, as shown in FIG. 18, axially-extending recesses 61 may be formed on (in) the outer-circumferential surface of the stator core 40 and the screws 81 may be mated (engaged) in the recesses 61 in order to impede rotation of the stator 23 relative to the motor case 22. In this modified embodiment too, the stator 23 can be impeded (block) from rotating using the stator core 40, which has high accuracy and high strength.

Furthermore, the rotation-impeding function can also be effected by using the through holes and the recesses in combination. The screw members may be bolts. The target of the rotation impeding is also not limited to the motor case; that is, if there is no motor case, then rotation of the stator relative to the motor housing or the like may be effected using the through holes, the recesses, or the like.

It should be noted that, although an electric work machine, in which a motor is fixed to a housing via a motor case was explained, the present teachings can also be applied to electric work machines in which a motor is fixed directly to the housing by fastening screws through through holes provided in the stator core. In such embodiments as well, the ridges may be mated with the housing.

In addition, if rotation is impeded (blocked) by mating the ridges with the housing, it is also possible to fix the brushless motor by sandwiching the brushless motor between the half housings. In such an embodiment, the through holes may be omitted.

Furthermore, in the above-described embodiment, although the motor case is formed from (comprises) the upper case and the lower case, the upper-lower arrangement is a positional relationship strictly for the sake of convenience, and there is no problem with respect to the electric work machine even if two half cases are arranged in the left-right direction, the forward-rearward direction, a diagonal direction, or the like.

Furthermore, any one of the cover members alone, such as the upper case, may be fixed to the housing side. In such an embodiment, because the other cover member can be omitted, ease of assembly is improved.

In addition, fins for heat dissipation may be provided on the stator core. Moreover, the heat-dissipating properties can also be improved by connecting structures to the motor case that have high heat-transfer (heat conductivity) properties.

Advantages of the Representative Three-Phase Coil Connection Method

In the lawn mower 1 of the above-mentioned embodiment, because the three phases of the coils 45 of the brushless motor 21 are delta connected, with each phase having four coils in parallel, the wire diameter of the wires 115A-115C can be made narrower than in a star connection, even given the same output, and thereby winding characteristics during manufacture can be improved. In addition, because the winding nozzles can be narrowed, dead space can be reduced, which ultimately leads to an increase in output power.

Here in particular, because the delta connection is formed by short circuiting, using the plurality of sheet-metal members (the first to third metal fittings 97U-97V) mounted on the upper insulator 42, the crossover wires 117A-C between the coils 45 wound on the teeth 41 adjacent in the circumferential direction of the stator core 40 through the upper insulator 42, a wiring connection becomes possible in which complex crossover wires, cross wires, and the like are not created. Thereby, productivity becomes high and, moreover, the risk of scraping of the wires 115 caused by contacting each other can be reduced.

In addition, there are twelve of the coils 45 for the three phases, each of the three wires 115 is used to continuously form four coils 45 adjacent in the circumferential direction of the stator core 40. Furthermore, a start end 116A, B of one wire 115 and a terminal end 118A, B, C of another wire 115 adjacent in the circumferential direction are electrically connected to each of the first to third metal fittings 97U-97V with the same orientation relative to the short-circuiting member 46. Therefore, the start ends 116A-C and the terminal ends 118 of the wires 115 can be cut simultaneously, whereby productivity is further improved.

It is noted that in the three-phase, coil-connection method, the wire-winding method is not limited to the above-described embodiment, and there is no problem even if the coils are formed with one, two, four, or six wires using one, two, four, or six winding nozzles. If there is one winding nozzle, then all twelve teeth are wound with one wire (12×1); if there are two winding nozzles, then six teeth are wound with two wires (6×2). In addition, if there are four winding nozzles, then three teeth are wound with four wires (3×4); and if there are six winding nozzles, then two teeth are wound with six wires (2×6).

If there is one winding nozzle, then it takes time to wind the wire on the teeth; however, because the number of the winding nozzles is small, the equipment is compact and equipment expenses can also be kept low. As the number of the winding nozzles increases, the time needed to wind the wires on the teeth decreases; however, the equipment increases in size and equipment expenses also increase.

In the above-mentioned embodiment, three of the winding nozzles are used because that it provides an advantageous balance between time and equipment for winding the wires. However, if more importance is attached to the advantages of equipment, then one or two of the winding nozzles should be used. On the other hand, if more importance is attached to reducing time requirements, then four or six of the winding nozzles should be used.

In addition, each phase is not limited four in parallel; five or more in parallel may be used.

Furthermore, the shape of the sheet-metal members is also not limited to the first to third metal fittings of the above-mentioned embodiment. For example, the width may be increased, some of the first to third metal fittings may be made to overlap in the axial direction without contacting, without being disposed concentrically, or the like.

Advantages of the Representative Diamond Knurl of the Rotary Shaft

In the lawn mower 1 of the above-mentioned embodiment, the slip torque (grip) between the rotary shaft 25 and the rotor core 55 can be increased by the provision of the diamond knurl 25a, which constitutes the rotation-impeding part in the rotational direction relative to the resin 56 and the slippage-impeding part in the axial direction relative to the resin 56, on the outer circumference of the rotary shaft 25.

Here in particular, by using the diamond knurl 25a, slip torque (grip) in the rotational direction and slip torque (grip) in the axial direction can be improved at the same time.

It is noted that the rotation-impeding part and the slippage-impeding part are not limited to a shape that acts upon both, as in the diamond knurl, and it is also possible to provide only one of the rotation-impeding part and the slippage-impeding part.

Figure 19A:
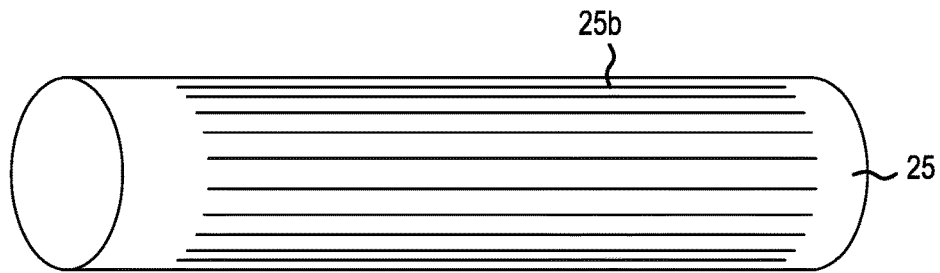
FIGS. 19A-E are explanatory diagrams of modified examples of a rotation-impeding part and a slippage-impeding part of a rotary shaft.

For example, as the rotation-impeding part, a straight knurl 25b as shown in FIG. 19A may be provided.

Figure 19B:
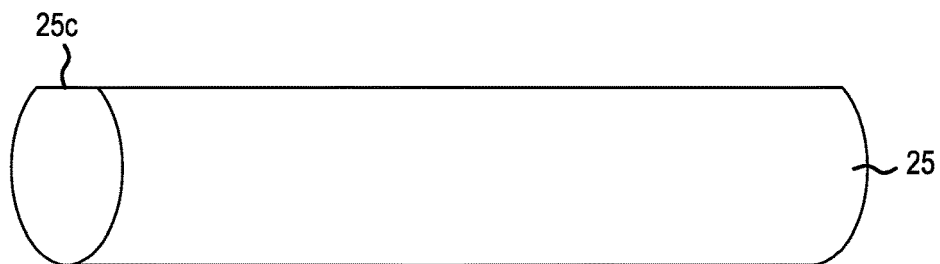
Figure 19C:
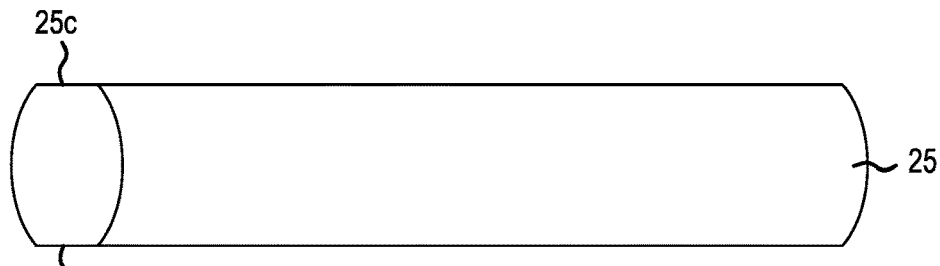
Figure 19D:
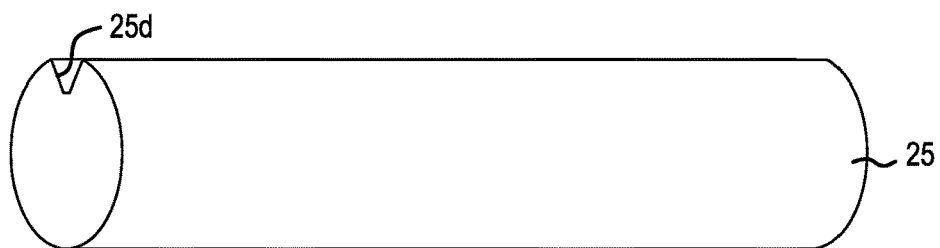

In addition, the grip (unevenness) on the rotary shaft 25 is not limited to knurling, and it is also possible to impede rotation by making the transverse-cross-sectional shape of the rotary shaft 25 into a shape other than a circular shape. FIGS. 19B and C show, as differently shaped parts, examples in which a bevel part 25c extending in the axial direction is formed at one or two locations, and FIG. 19D shows an example in which a V-shaped groove 25d extending in the axial direction is formed. However, the number of bevel parts may be formed at three or more locations, and the number of the grooves also may be increased. The groove may have a shape other than a V shape.

Furthermore, the differently shaped part is not limited to the bevel part, the groove, or the like, and the transverse-cross-sectional shape may be a quadrilateral shape, a polygonal shape, or the like and may be an elliptical shape, an oval shape, or the like.

Figure 19E:
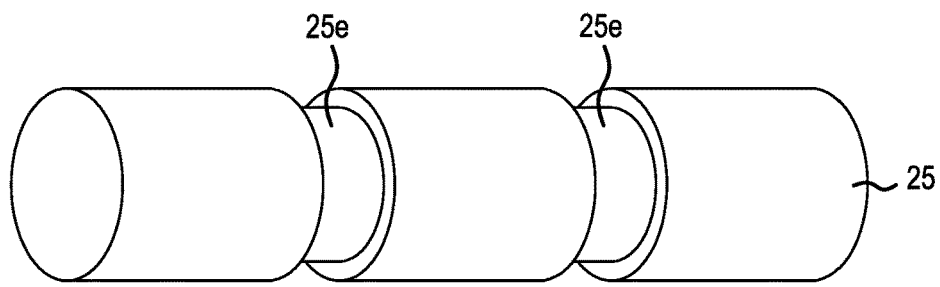

On the other hand, as the slippage-impeding part, as shown in FIG. 19E, ring grooves 25e extending in the circumferential direction of the rotary shaft 25 can also be formed at prescribed spacings in the axial direction. There may be one or three or more of the ring grooves. Moreover, the grooves may be provided only partially in the circumferential direction, i.e. in a ring (annular) shape.

Furthermore, the rotation-impeding part and the slippage-impeding part can also be combined. For example, if the ring groove is combined with the straight knurl or if the ring groove is combined with a differently shaped part configured as a bevel part, a groove, or the like, then the effect of both rotation impeding and slippage impeding are obtained.

Advantages of the Representative Insulating Means Between the Stator Core and the Rotary Shaft The lawn mower 1 of the above-described embodiment comprises: the main-body housing 10 (an exterior housing); the motor case 22 (an interior case) fixed inside the main-body housing 10; the brushless motor 21 housed inside the motor case 22 and comprising the stator 23 having the stator core 40, the coils 45, and the upper and lower insulators 42, 43, and the rotor 24 disposed inward of the stator 23 and having the rotary shaft 25; and the spindle 17 (an output part) driven by the rotary shaft 25. The motor case 22 holds the stator 23 and axially supports the rotary shaft 25 via bearings 68, 76. The insulating cap 67 and the resin layer 78 (which are each an insulating means) provide electrical insulation between the stator core 40 and the rotary shaft 25. Therefore, even if the brushless motor 21 is housed in the (metal) motor case 22 inside the main-body housing 10, double insulation becomes possible in which the conducting pathway from the (metal) stator core 40 through the (metal) motor case 22 to the (metal) rotary shaft 25 can be effectively insulated.

Here in particular, because the resin 56 (the insulating member on the rotary-shaft side) is interposed between the rotor core 55 and the rotary shaft 25, which are provided in the rotor 24, more effective insulation becomes possible.

In addition, because the insulating means may include the insulating cap 67 (bearing-side insulating member), which is provided at a portion of the motor case 22 that rotatably supports the rotary shaft 25 via the bearing 68, and/or the resin layer 78 (stator-side insulating member), which is provided between the motor case 22 and the stator core 40, the insulating means can be formed effectively.

Furthermore, if the resin layer 78 is integrally formed on (joined to) the lower case 27 of the motor case 22, it becomes possible to form the resin layer 78 in a simple manner at the time of manufacturing the lower case 27.

It is noted that the insulating means according to the present teachings is not limited to the insulating cap 67 and the resin layer 78 of the above-described embodiment. For example, as the bearing-side insulating member, a resin material (electrically insulating resin or polymer material) may be interposed between the bearing and the rotary shaft. In addition or in the alternative, as the stator-side insulating member, an electrically insulating resin or polymer layer may be formed on the outer side of the rotor core. The bearing-side insulating member can also be integrally formed with (on) the motor case. In addition or in the alternative, either one or both of the upper case and the lower case of the motor case can also be made of resin or polymer. Furthermore, the bearing-side insulating member and/or the stator-side insulating member can also be used in combination. Either one of the bearing-side insulating member and the stator-side insulating member can also be omitted.

Figure 20:
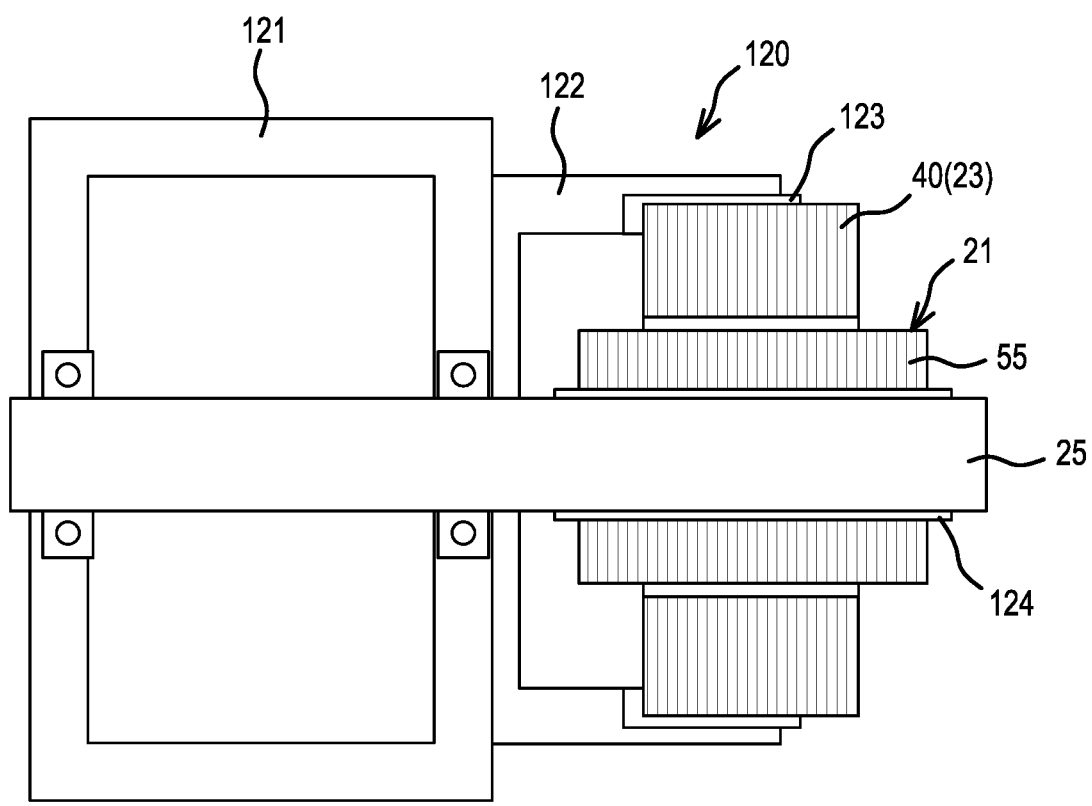
FIG. 20 is an explanatory diagram that shows a double-insulated structure of a compressor.

In another embodiment of the present teachings, a compressor 120 is schematically shown in FIG. 20. In the compressor 120, the stator 23 of the brushless motor 21 is supported on the outer side of a housing 121 via a stator-support member 122, which has a bottomed-tube shape. Furthermore, the rotary shaft 25 extends into the housing 121 and is connected to an output part (not shown), which may be e.g., a piston, rotary screw, vane, scroll, etc. In addition, a first insulating member 123 is interposed between the stator-support member 122 and the stator core 40 and a second insulating member 124 is interposed between the rotary shaft 25 and the rotor core 55, thereby providing double insulation between the stator core 40 and the rotary shaft 25 on one side and the housing 121 on the other (here, although not shown, basic insulation is also implemented by interposing a basic-insulation member between the coils and the stator core, as in the above-described embodiment).

It is noted that the housing 121 and the stator-support member 122 herein may be integral. In addition or in the alternative, the rotation-impeding part and/or the slippage-impeding part, such as a diamond knurl, also may be fabricated on the rotary shaft 25.

Finally, it should be noted the present teachings are applicable to other types of electric work machines, i.e. other than a lawn mower, a compressor, or the like. For example, the present teachings may be suitably applied to gardening tools (e.g., outdoor power equipment), such as electrically powered chain saws, hedge trimmers, mowing machines, blowers, and the like, as well as to other types of power tools, such as angle drills, grinders, hammers, hammer drills, circular saws, reciprocating saws ("recipro saws"), and the like. Thus, in such embodiments, the output part of the electric work machine may be e.g., a saw chain, shears, a blower fan, a tool chuck, a tool holder, a disk (e.g., a grinding, sanding or polishing disk), a cutting blade, a piston, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved brushless motors and electric work machines that utilize such brushless motors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Lawn mower
2 Base
3 Main body
4 Handle
10 Main-body housing
15 Controller
16 Motor unit
17 Spindle
20 Cutting blade
21 Brushless motor
22 Motor case
23 Stator
24 Rotor
25 Rotary shaft
25a Diamond knurl
26 Upper case
27 Lower case
40 Stator core
40a Steel plate
41 Tooth
42 Upper insulator
43 Lower insulator
45 Coil
46 Short-circuiting member 47 Sensor circuit board
48A, 48B Ridge
50A, 50B Projection
54 Split mold
55 Rotor core
56 Resin (representative insulating member)
65 Fin
67 Insulating cap (representative insulating means)
71A, 71B Screw-boss part
78 Resin layer (representative insulating means)
79A, 79B Boss part
81 Screw
85 Terminal-holding part
97U-97V First to third metal fittings
99 Fusing terminal
115 Wire
120 Compressor
122 Stator-support member
123, 124 Insulating member

We claim:

1. An electric power tool comprising:
a stator including a stator core, an insulator supported by the stator core and coils supported by the insulator;
a rotor that is rotatable relative to the stator, the rotor including a rotor core, permanent magnets in and/or on the rotor core, a rotor shaft extending into the rotor core and having a knurled first outer surface portion, and a layer of electrically insulating material between the knurled first outer surface portion and the rotor core;
an output part operably coupled to and driven by the rotor shaft; and
a housing that houses the stator;
wherein knurls of the knurled first outer surface portion are configured to impede relative rotation between the rotor shaft and the layer of electrically insulating material.

2. The electric power tool according to claim 1, wherein the knurls are arranged in a lattice or grid.

3. The electric power tool according to claim 1, wherein the rotor shaft includes at least one second outer surface portion that is smoother than the knurled first outer surface portion.

4. The electric power tool according to claim 3, wherein:
a first segment of the knurled first outer surface portion is located inside the rotor core and
a second segment of the knurled first outer surface portion is located outside the rotor core.

5. The electric power tool according to claim 4, wherein:
the knurled first outer surface portion has a first axial length,
the rotor core has a second axial length, and
the first axial length is greater than the second axial length.

6. The electric power tool according to claim 5, wherein the layer of electrically insulating material overlaps at least a portion of at least one axial end surface of the rotor core.

7. The electric power tool according to claim 6, wherein the knurls are arranged in a lattice or grid.

8. The electric power tool according to claim 1, wherein:
a first segment of the knurled first outer surface portion is located inside the rotor core and
a second segment of the knurled first outer surface portion is located outside the rotor core.

9. The electric power tool according to claim 1, wherein the layer of electrically insulating material projects outside the rotor core.

10. The electric power tool according to claim 1, wherein the layer of electrically insulating material overlaps at least a portion of at least a first axial end surface of the rotor core.

11. The electric power tool according to claim 10, wherein the layer of electrically insulating material overlaps at least a portion of a second axial end surface of the rotor core.

12. The electric power tool according to claim 1, wherein the layer of electrically insulating material is exposed at an axial end surface of the rotor core.

13. An electric work machine comprising:
a stator including a stator core, an insulator supported by the stator core and coils supported by the insulator;
a rotor that is rotatable relative to the stator, the rotor including a rotor core, permanent magnets in and/or on the rotor core, a rotor shaft extending into the rotor core and having a first outer surface portion, and a layer of electrically insulating material between the first outer surface portion and the rotor core;
an output part operably coupled to and driven by the rotor shaft; and
a housing that houses the stator;
wherein the first outer surface portion includes a gripping pattern configured to impede relative rotation between the rotor shaft and the layer of electrically insulating material.

14. The electric work machine according to claim 13, wherein the rotor shaft includes at least one second outer surface portion that is smoother than the first outer surface portion.

15. The electric work machine according to claim 13, wherein:
the first outer surface portion has a first axial length,
the rotor core has a second axial length, and
the first axial length is greater than the second axial length.

16. The electric work machine according to claim 13, wherein:
a first segment of the first outer surface portion is located inside the rotor core and
a second segment of the first outer surface portion is located outside the rotor core.

17. The electric work machine according to claim 13, wherein the gripping pattern comprises a knurling.

18. The electric work machine according to claim 13, wherein the layer of electrically insulating material overlaps at least a portion of at least one axial end surface of the rotor core.

19. The electric work machine according to claim 13, wherein:
the first outer surface portion has a first axial length, the rotor core has a second axial length, and the first axial length is greater than the second axial length,
the gripping pattern comprises a knurling, and
the layer of electrically insulating material overlaps at least a portion of at least one axial end surface of the rotor core.

* * * * *